US012587976B2

(12) United States Patent
Ericson et al.

(10) Patent No.: US 12,587,976 B2
(45) Date of Patent: Mar. 24, 2026

(54) ADAPTING INTEGRATED ACCESS AND BACKHAUL NODE CELL COVERAGE

(71) Applicant: Telefonaktiebolaget LM Ericsson (publ), Stockholm (SE)

(72) Inventors: Mårten Ericson, Gammalstad (SE); Min Wang, Luleå (SE); Jan Christoffersson, Luleå (SE); Tommy Arngren, Södra Sunderbyn (SE); Hans Hannu, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 436 days.

(21) Appl. No.: 18/040,737

(22) PCT Filed: Aug. 11, 2020

(86) PCT No.: PCT/EP2020/072548
§ 371 (c)(1),
(2) Date: Feb. 6, 2023

(87) PCT Pub. No.: WO2022/033667
PCT Pub. Date: Feb. 17, 2022

(65) Prior Publication Data
US 2023/0284156 A1 Sep. 7, 2023

(51) Int. Cl.
*H04W 52/36* (2009.01)
*H04W 52/34* (2009.01)

(52) U.S. Cl.
CPC ....... *H04W 52/367* (2013.01); *H04W 52/343* (2013.01)

(58) Field of Classification Search
CPC ............. H04W 52/367; H04W 52/343; H04W 28/0247; H04W 40/22; H04W 36/26; Y02D 30/70
See application file for complete search history.

(56) References Cited

U.S. PATENT DOCUMENTS 8,363,564 B1 * 1/2013 Talley ................ H04W 52/267
370/252
2013/0109390 A1 5/2013 Tokgoz et al.
(Continued)

FOREIGN PATENT DOCUMENTS

CN 103906076 A 7/2014
CN 104581780 A 4/2015
(Continued)

OTHER PUBLICATIONS

International Search Report and Written Opinion dated Apr. 23, 2021 for International Application No. PCT/EP2020/072548 filed Aug. 11, 2020, consisting of 10 pages.
(Continued)

*Primary Examiner* — Christine Ng
(74) *Attorney, Agent, or Firm* — Weisberg I.P. Law, P.A.

(57) ABSTRACT
Methods and apparatus are provided for adapting a serving cell capacity of an integrated access and backhaul, IAB, node serving one or more wireless devices. In one embodiment a method is performed by the IAB node. The method includes determining a value corresponding to a backhaul link capacity, adapting, based on the determined value, a power level of the serving cell and signalling, to one or more served wireless devices, information indicative of the adapted serving cell power level.

12 Claims, 18 Drawing Sheets

(56) References Cited

U.S. PATENT DOCUMENTS

| | | | | |
|---|---|---|---|---|
| 2013/0194921 | A1 | 8/2013 | Zhang et al. | |
| 2014/0016537 | A1 | 1/2014 | Khobare et al. | |
| 2014/0219243 | A1* | 8/2014 | Meshkati | H04W 52/243 |
| | | | | 370/329 |
| 2015/0055517 | A1* | 2/2015 | Samdanis | H04W 36/0064 |
| | | | | 370/280 |
| 2015/0181455 | A1* | 6/2015 | Song | H04W 88/08 |
| | | | | 455/561 |
| 2015/0208358 | A1* | 7/2015 | Ahn | H04W 52/146 |
| | | | | 455/522 |
| 2015/0215874 | A1* | 7/2015 | Chen | H04W 52/346 |
| | | | | 455/522 |
| 2016/0057679 | A1 | 2/2016 | Werner et al. | |
| 2017/0086147 | A1* | 3/2017 | Zhang | H04W 52/245 |
| 2017/0374624 | A1* | 12/2017 | Ahn | H04W 52/54 |
| 2018/0310258 | A1* | 10/2018 | Goria | H04W 24/02 |
| 2019/0007126 | A1* | 1/2019 | Regunathan | H04W 28/04 |
| 2020/0068509 | A1* | 2/2020 | Ahn | H04B 17/318 |
| 2020/0107362 | A1* | 4/2020 | Qi | H04W 88/085 |
| 2021/0058985 | A1* | 2/2021 | Fujishiro | H04W 16/32 |
| 2021/0399863 | A1* | 12/2021 | Yu | H04B 17/327 |
| 2022/0240194 | A1* | 7/2022 | Lee | H04W 52/242 |
| 2023/0080014 | A1* | 3/2023 | Fujishiro | H04W 36/362 |
| | | | | 370/315 |

FOREIGN PATENT DOCUMENTS

| | | | |
|---|---|---|---|
| CN | 108513323 | A | 9/2018 |
| WO | 2021188020 | A1 | 9/2021 |

OTHER PUBLICATIONS

RAN Working Group 3 meeting #53bis R3-061530; Title: Self optimisation Scenarios; Agenda Item: 7.5.1; Source: NEC; Document for: discussion and approval; Location and Date: Seoul, Korea, Oct. 10-13, 2006, consisting of 3 pages.

3GPP TR 38.874 V16.0.0; 3rd Generation Partnership Project; Technical Specification Group Radio Access Network; NR; Study on Integrated Access and Backhaul; (Release 16); Dec. 2018, consisting of 111 pages.

3GPP TS 38.213 V15.10.0; 3rd Generation Partnership Project; Technical Specification Group Radio Access Network; NR; Physical layer procedures for control (Release 15); Jun. 2020, consisting of 109 pages.

3GPP TS 38.215 V15.7.0; 3rd Generation Partnership Project; Technical Specification Group Radio Access Network; NR; Physical layer measurements (Release 15); Jun. 2020, consisting of 16 pages.

3GPP TS 38.331 V15.10.0; 3rd Generation Partnership Project; Technical Specification Group Radio Access Network; NR; Radio Resource Control (RRC) protocol specification (Release 15); Jul. 2020, consisting of 539 pages.

3GPP TS 38.214 V15.10.0; 3rd Generation Partnership Project; Technical Specification Group Radio Access Network, NR; Physical layer procedures for data (Release 15); Jun. 2020, consisting of 106 pages.

Chinese Office Action and English Summary Translation dated Oct. 28, 2024 for Application No. 202080106099.7, consisting of 12 pages.

* cited by examiner

| referenceSignalPower | Octet 1 |

| referenceSignalPower(SSB) | Octet 1 |
| referenceSignalPower(OffsetSS) | Octet 2 |

1200

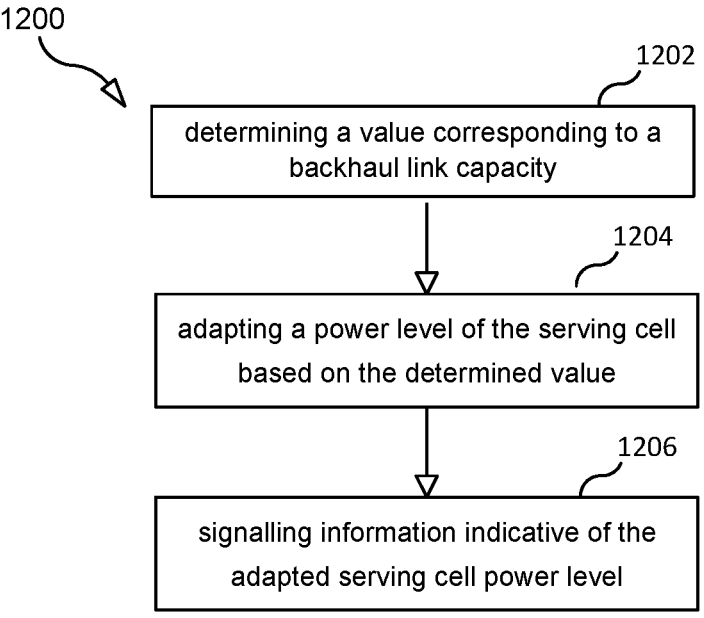

1202 determining a value corresponding to a backhaul link capacity

1204 adapting a power level of the serving cell based on the determined value

1206 signalling information indicative of the adapted serving cell power level

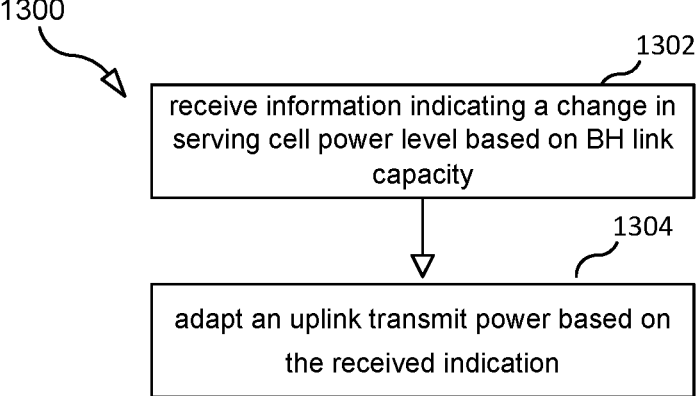

1302 receive information indicating a change in serving cell power level based on BH link capacity

1304 adapt an uplink transmit power based on the received indication

FIG. 13

ADAPTING INTEGRATED ACCESS AND BACKHAUL NODE CELL COVERAGE

CROSS-REFERENCE TO RELATED APPLICATION

This application is a Submission Under 35 U.S.C. § 371 for U.S. National Stage Patent Application of International Application Number: PCT/EP2020/072548, filed Aug. 11, 2020 entitled "ADAPTING INTEGRATED ACCESS AND BACKHAUL NODE CELL COVERAGE," the entirety of which is incorporated herein by reference.

TECHNICAL FIELD

Embodiments herein relate generally to integrated access and backhaul nodes and, in particular, to adapting cell coverage.

BACKGROUND

In $3^{rd}$ Generation Partnership Project (3GPP) Rel-16 time frame potential solutions for efficient operation of integrated access and wireless access backhaul (IAB) in new radio (NR) are studied in IAB study item/work item. In the studied scenarios, an IAB network comprising several IAB nodes and UEs served by these IAB nodes. The data routing is performed across IAB nodes. The 3GPP Rel-15 functionalities are assumed as baseline for any potential enhancement Densification via the deployment of more and more base stations (macro or micro base stations) is one of the mechanisms that can be employed to satisfy the ever-increasing demand for bandwidth/capacity in mobile networks. Due to the availability of more spectrum in the millimeter wave (mmw) band, deploying small cells that operate in this band is an attractive deployment option for these purposes. However, deploying fibre to the small cells, which is the usual way in which small cells are deployed, can end up being very expensive and impractical. Thus, employing a wireless link for connecting the small cells to the operator's network is a cheaper and practical alternative. One such solution is an Integrated Access and Backhaul (IAB) network, where the operator can utilize part of the radio resources for the backhaul link.

In FIG. 1, an example IAB deployment is presented, where the IAB donor node (in short IAB donor) has a wired connection to the core network and the IAB relay nodes (in short IAB nodes) are wirelessly connected using NR to the IAB donor, either directly or indirectly via another IAB node. The connection between IAB donor/node and UEs is called access link, whereas the connection between two IAB nodes or between an IAB donor and an IAB node is called backhaul link. The example shows two IAB nodes but in other examples only one IAB node may be deployed or multiple IAB hops or backhaul links. Referring to FIG. 2, the adjacent upstream node which is closer to the IAB donor node of an IAB node may be referred to as a parent node of the IAB node. The adjacent downstream node which is further away from the IAB donor node of an IAB node may be referred to as a child node of the IAB node. The backhaul link between the parent node and the IAB node may thus be referred to as the parent (backhaul) link, whereas the backhaul link between the IAB node and the child node may be referred to as a child (backhaul) link.

FIG. 3 depicts a baseline User Plane (UP) Protocol stack for IAB in 3GPP Rel-16. During the study item phase of the IAB work (summary of the study item can be found in the technical report TR 38.874 V16.0.0 (2019-01-10)), it was agreed to adopt a solution that leverages the Central Unit (CU)/Distributed Unit (DU) split architecture of NR. Hence, an IAB node consist of a DU part, which serves UEs and possible other so-called child IAB nodes, and a MT part, which handles the backhaul link towards another IAB (DU) node or the IAB (DU) donor.

In this architecture, each IAB-node includes a Mobile Termination (MT) and a distributed unit (DU). In an IAB node, the MT function is a logical unit which terminates the backhaul radio interface toward the IAB parent node. Via the MT, the IAB-node connects to an upstream IAB-node or the IAB-donor. Via the DU, the IAB-node establishes radio link control (RLC)-channels to UEs and to MTs of downstream IAB-nodes. For MTs, this RLC-channel may refer to a modified RLC, denoted RLC*. An IAB-node can connect to more than one upstream IAB-node or IAB-donor DU. The IAB-node may contain multiple DUs, but each DU part of the IAB-node has one F1-C connection only with one IAB-donor CU-CP.

The donor node also includes a DU to support UEs and MTs of downstream IAB-nodes. The IAB-donor includes one or more CU for the DUs of all IAB-nodes and for its own DU. It is assumed that the DUs on an IAB-node are served by or connected to only one IAB-donor. This IAB-donor node may change through topology adaptation. Each DU of an IAB-node connects to the CU in the IAB-donor using a modified form of F1, which is referred to as F1*. F1*-U runs over RLC channels on the wireless backhaul between the MT on the IAB-node and the DU on the donor. An adaptation layer is added, which holds routing information, enabling forwarding. It replaces the IP functionality of the standard F1-stack. F1*-U may carry a GPRS tunneling protocol user plane (GTP-U) header for the end-to-end association between CU and DU. In a further example, information carried inside the GTP-U header may be included into the adaption layer.

With reference to FIG. 4, the chosen protocol stacks reuse the current CU-DU split as specified in Rel-15, where the full user plane F1-U (GTP-U/UDP/IP) is terminated at the IAB node (like a normal DU) and the full control plane F1-C (F1-AP/SCTP/IP) is also terminated at the IAB node (like a normal DU). In the cases a), b) and c), depicted in FIG. 4, Network Domain Security (NDS) is assumed to protect both UP and CP traffic (IPsec in the case of UP, and DTLS in the case of CP). IPsec could also be used for the CP protection instead of DTLS (in this case no DTLS layer would be required).

A new layer, called adaptation layer has been introduced in the IAB nodes and the IAB donor, which is used for routing of packets to the appropriate downstream/upstream node and also mapping the UE bearer data to the proper backhaul RLC channel (and also between ingress and egress backhaul RLC channels in intermediate IAB nodes) to satisfy the end to end QoS requirements of bearers.

The radio resource control (RRC) connection for the IAB node is between the MT and the CU-CP, which is also the case for the UEs connected to the IAB (DU). A UE in active mode performs measurements in order to provide the network with its current radio conditions. These measurements are used in the current transfer of user data and in the management and configuration of the system. The same applies to the MT of the IAB node. Hence, measurement reports are processed in the CU-CP.

In the case of inter-CU topology adaptation due to deteriorating radio link quality of the backhaul link of an IAB node (the link between the MT and the IAB-donor or parent IAB node (IAB DU) in case of multi-hop), the current approach in TR 38.874 is to discontinue service when the migrating IAB-node's MT connects to the target CU during Inter-gNB handover since it loses connectivity to its source CU. Consequently, UEs connected to this DU observe radio link failure (RLF). The UE will suffer from RLF and must perform RRC reconnection establishment in case of inter-CU topology adaptation.

In the case of intra-CU topology adaptation due deteriorating radio link quality of an IAB node there may not be an RLF if the handover is successful.

In NR Rel-15, as captured in the 3GPP TS 38.213 V15.10.0 (2020 Jul. 17), a UE estimates the DL pathloss based on the formula:

$$PL_{s,f,e}(q_d)=\text{referenceSignalPower}-\text{higher layer filtered RSRP} \quad (1)$$

where referenceSignalPower is provided by higher layers and RSRP is the reference signal received power, defined in 3GPP TS 38.215 V15.7.0 (2020 Jul. 14) for the reference serving cell and the higher layer filter configuration provided by QuantityConfig is defined in 3GPP TS 38.331 V15.10.0 (2020 Jul. 24) for the reference serving cell.

If the UE is not configured for periodic channel state information-reference signal (CSI-RS) reception, referenceSignalPower is provided by ss-PBCH-BlockPower (included in the System Information block message which is broadcasted periodically). If the UE is configured for periodic CSI-RS reception, referenceSignalPower is provided either by ss-PBCH-BlockPower or by powerControlOffsetSS (via RRC signaling) providing an offset of the CSI-RS transmission power relative to the SS/PBCH block transmission power in 3GPP TS 38.214 V15.10.0 (2020 Jul. 17). If powerControlOffsetSS is not provided to the UE, the UE assumes an offset of 0 dB.

The DL pathloss PL described above is used in the UL power control in LTE and NR. In brief, the UL power per subband (PSD) is updated as $$PSD=P0+a*PL \quad (2)$$

$$Ptx=P0+a*PL+lin2db(M) \quad (3)$$

The parameter a is the fractional pathloss compensation factor (1.0 means total compensation).

P0 is calculated like this:

$$P0=\text{alfa}*(\text{sinrTarget}+lin2db(\text{noisePowerPerSubband})+\text{noiseRise})+(1-\text{alfa})*(\text{maximumPower}-lin2db(M0)) \quad (4)$$

Typical numbers of the above parameters are M0=6 (default number of resource blocks), noiseRise=0 dB, lin2db (noisePowerPerSubband)=5 dB over noise floor (i.e. −146 dB per subband of 180 KHz), sinrTarget=12.6 dB and alfa (a)=0.8. The interpretation of the PO equation above is that a UE with Ptx=Pmax and using M=M0 subbands (or resource blocks (RBs)) will be able to reach the desired target SINRO (which is equal to sinrTarget above).

Decreasing PO causes lower user transmit power and can be achieved by decreasing the sinrTarget (SINRO) or increasing the MO.

In patent application PCT/SE2020/050269, "Mobility mechanism based on backhaul warning bit for IAB", the IAB node may use a 'warning' message targeting all UEs connected downwards to trigger measurements which would be reported to the CU-UP. Although this is a non-complex solution it may have at least one drawback in increased measurement reporting.

SUMMARY

A mechanism to adapt the access link capacity based on the backhaul link quality is proposed. Each IAB node monitors their respective backhaul link quality. The IAB node adjusts its downlink transmission power for each SS/PBCH block on the downstream link according to the measured backhaul (BH) link quality indication to trigger UEs to HO to other nodes. This is repeated as long as the IAB access link throughput is higher than backhaul link capacity or a minimum downlink transmission power is reached.

As a second step if the IAB access link throughput is higher than the backhaul link capacity, the Cell-ULPC-OFFSET is adjusted to bring down the bit rate of selected high bit rate UEs.

In case a BH link radio quality becomes bad, which has a risk to cause BH RLF on the BH link of a path/route, the other hops (at least downstream links) of the path/route are adjusted accordingly to be aligned with the reduced BH link capacity.

The adjustment ensures that a portion of the cell edge UEs can perform timely recovery actions (such as handover) and if needed high bit-rate UEs reduce their UL bitrate. The main advantage with the latter is that by decrease users UL bitrate we both adapt to the BH available capacity and lower the interference in the IAB cell. Both these actions mean that we in fact shrink the cell coverage in both the DL and the UL and avoid that UEs trigger RLF.

The following benefits may be achieved:
1) IAB node can take proper recovery actions for the BH RLF in good time to reduce latency
2) avoiding flooding other links with signaling distribution. With this approach we will have a natural selection of targeting the cell edge users.
3) Using proposed MAC CE and/or DCI based signaling alternative, the IAB node of the concerned BH link can signal the relevant UEs of change of the synchronization reference signals and/or the cell-ulpc-offset in a timely manner. In a first aspect a method is performed by an integrated access and backhaul, IAB, node for adapting a serving cell capacity. The method comprising determining a value corresponding to a backhaul link capacity, adapting, based on the determined value, a power level of the serving cell and signalling, to one or more served wireless devices, information indicative of the adapted serving cell power level. In some examples of this aspect the power level comprises a reference signal power level. The reference In some examples the signalled information comprises a reference signal power parameter to indicate an adapted path loss level corresponding to the adapted serving cell power level indicative to the one or more wireless device to maintain its uplink transmission power with respect to the adapted serving cell power level. In some examples the signalling information is comprised in a medium access control, MAC, control element, CE, or in a downlink control information, DCI. In some examples the one or more wireless devices are determined to be within than a predefined distance from the served cell and/or with a radio channel quality above a certain level. In some examples, the method includes sending to one or more wireless devices a transmit power level parameter to reduce the transmit power of the one or more wireless devices. The transmit power level parameter may be a cell uplink power control offset to be applied to a power per sub-band calculation to be performed by the one or more wireless devices, causing a per wireless device reduction in uplink transmit power. In some examples the transmit power level parameter is comprised in a MAC CE. In some examples the transmit power level parameter comprises a transmit power control, TPC, command in a DCI. In some examples the one or more wireless devices are determined to correspond to high data rate users. In some examples the method further comprises determining a second value corresponding to the backhaul link capacity and sending to a further one or more wireless devices a transmit power level parameter to reduce the transmit power of the one or more wireless devices based on the determined second value corresponding to the backhaul link capacity. In some examples the signalled information and/or signalled transmit power level further comprises a backhaul link identifier. In some examples the wireless device is an IAB node.

In another aspect, a method is performed by a wireless device served by an integrated access and backhaul, IAB, node. The method comprising receiving information indicating a change in serving cell power level, wherein the indication indicates the change is in response to a change in backhaul link capacity and adapting an uplink transmit power based on the received indication. In some examples of this aspect the power level comprises a reference signal power level. In some examples the reference signal power level is at least one of SSB/CSI-RS power and referenceSignalPower. In some examples the signalled information comprises a reference signal power parameter to indicate an adapted path loss level corresponding to the adapted serving cell power level indicative to the wireless device to maintain its uplink transmission power with respect to the adapted serving cell power level and the wireless device maintaining its uplink transmit power based on the received indication. In some examples the signalling information is comprised in a medium access control, MAC, control element, CE, or in a downlink control information, DCI. In some examples the receiving of the information in a MAC CE or a DCI is the indication that the wireless device is to maintain its uplink transmission power with respect to the adapted serving cell power level. The received information may comprise a transmit power level parameter to indicate to reduce the transmit power of the wireless device. The received information may also comprise a cell uplink power control offset and the wireless adapting the uplink transmit power per sub-band calculation based on the cell uplink power control offset. The power per sub-band may be calculated according to:

$$PSD = P0 + a*PL - \text{Cell-ULPC-OFFSET};$$

wherein P0=alfa*(sinrTarget+lin2db(noisePowerPerSubband)+noiseRise)+(1−alfa)*(maximumPower−lin2db(M0))
parameter a is the fractional pathloss compensation factor where 1.0 means total compensation;
PL is the downlink path loss; and
M0=the default number of sub-bands or resource blocks.
In some examples of this aspect, the wireless device corresponds to a high data rate user. In further examples, the received information comprises a backhaul link identifier. In some examples the wireless device is an IAB node. In some examples the signalling information is comprised in a medium access control, MAC, control element, CE, or in a downlink control information, DCI. In some examples the transmit power level parameter comprises a transmit power control, TPC, command in a DCI.

In another aspect, an integrated access and backhaul, IAB, node for adapting a serving cell capacity is provided. The IAB node is configured to determine a value corresponding to a backhaul link capacity, adapt, based on the determined value, a power level of the serving cell and signal, to one or more served wireless devices, information indicative of the adapted serving cell power level. In some examples the power level comprises a reference signal power level. In some examples the reference signal power level is at least one of SSB/CSI-RS power and referenceSignalPower. In some examples the signalled information comprises a reference signal power parameter to indicate an adapted path loss level corresponding to the adapted serving cell power level indicative to the one or more wireless device to maintain its uplink transmission power with respect to the adapted serving cell power level. In some examples the signalling information is comprised in a medium access control, MAC, control element, CE, or in a downlink control information, DCI. In some examples the one or more wireless devices are determined to be within a predefined distance from the served cell and/or with a radio channel quality above a certain level. In other examples, the IAB node is further configured to send to one or more wireless devices a transmit power level parameter to reduce the transmit power of the one or more wireless devices. The transmit power level parameter may be a cell uplink power control offset to be applied to a power per sub-band calculation to be performed by the one or more wireless devices, causing a per wireless device reduction in uplink transmit power. In some examples the transmit power level parameter is comprised in a MAC CE. In some examples the transmit power level parameter comprises a transmit power control, TPC, command in a DCI. In some examples the one or more wireless devices are determined to correspond to high data rate users. In some examples of this aspect the IAB node is further configured to determine a second value corresponding to the backhaul link capacity and send to a further one or more wireless devices a transmit power level parameter to reduce the transmit power of the one or more wireless devices based on the determined second value corresponding to the backhaul link capacity. In some examples the signalled information and/or signalled transmit power level further comprises a backhaul link identifier. In some examples the wireless device is an IAB node.

In another aspect, a wireless device for communicating with an integrated access and backhaul, IAB, node, is provided. The wireless device is configured to receive information indicating a change in serving cell power level, wherein the indication indicates the change is in response to a change in backhaul link capacity and adapt an uplink transmit power based on the received indication. In some examples the power level comprises a reference signal power level. In some examples the reference signal power level is at least one of SSB/CSI-RS power and referenceSignalPower. In some examples the received information comprises a reference signal power parameter to indicate an adapted path loss level corresponding to the adapted serving cell power level indicative to the wireless device to maintain its uplink transmission power with respect to the adapted serving cell power level and the wireless device maintaining its uplink transmit power based on the received indication. In some examples the received information is comprised in a medium access control, MAC, control element, CE, or in a downlink control information, DCI. In some examples the receiving of the information in a MAC CE or a DCI is the indication that the wireless device is to maintain its uplink transmission power with respect to the adapted serving cell power level. In some examples the received information comprises a transmit power level parameter to indicate to reduce the transmit power of the wireless device. In some examples the received information comprises a cell uplink power control offset and the wireless adapting the uplink transmit power per sub-band calculation based on the cell uplink power control offset. In some examples the power per sub-band is calculated according to:

$$PSD=P0+a*PL-\text{Cell-ULPC-OFFSET};$$

wherein P0=alfa*(sinrTarget+lin2db(noisePowerPerSub-band)+noiseRise)+(1−alfa)*(maximumPower−lin2db(M0))

parameter a is the fractional pathloss compensation factor where 1.0 means total compensation;

PL is the downlink path loss; and

M0=the default number of sub-bands or resource blocks.

In some examples the wireless device corresponds to a high data rate user. The received information may comprise a backhaul link identifier. In some examples the wireless device is an IAB node. In some examples the signalling information is comprised in a medium access control, MAC, control element, CE, or in a downlink control information, DCI. In some examples the transmit power level parameter comprises a transmit power control, TPC, command in a DCI.

In another aspect a computer program is provided. The computer program comprising instructions which when executed on a processor, cause the processor to perform any one of the methods described above. A computer program product, memory or carrier may also be provided which comprises the aforementioned computer program.

BRIEF DESCRIPTION OF THE DRAWINGS

FIG. 12 shows a flow chart according to one or more embodiments of the present disclosure.

FIG. 13 shows a flow chart according to one or more embodiments of the present disclosure.

DETAILED DESCRIPTION

Embodiments are disclosed to address one or more problems previously discussed, where some embodiments are exemplified with the aid of drawings whereas others, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
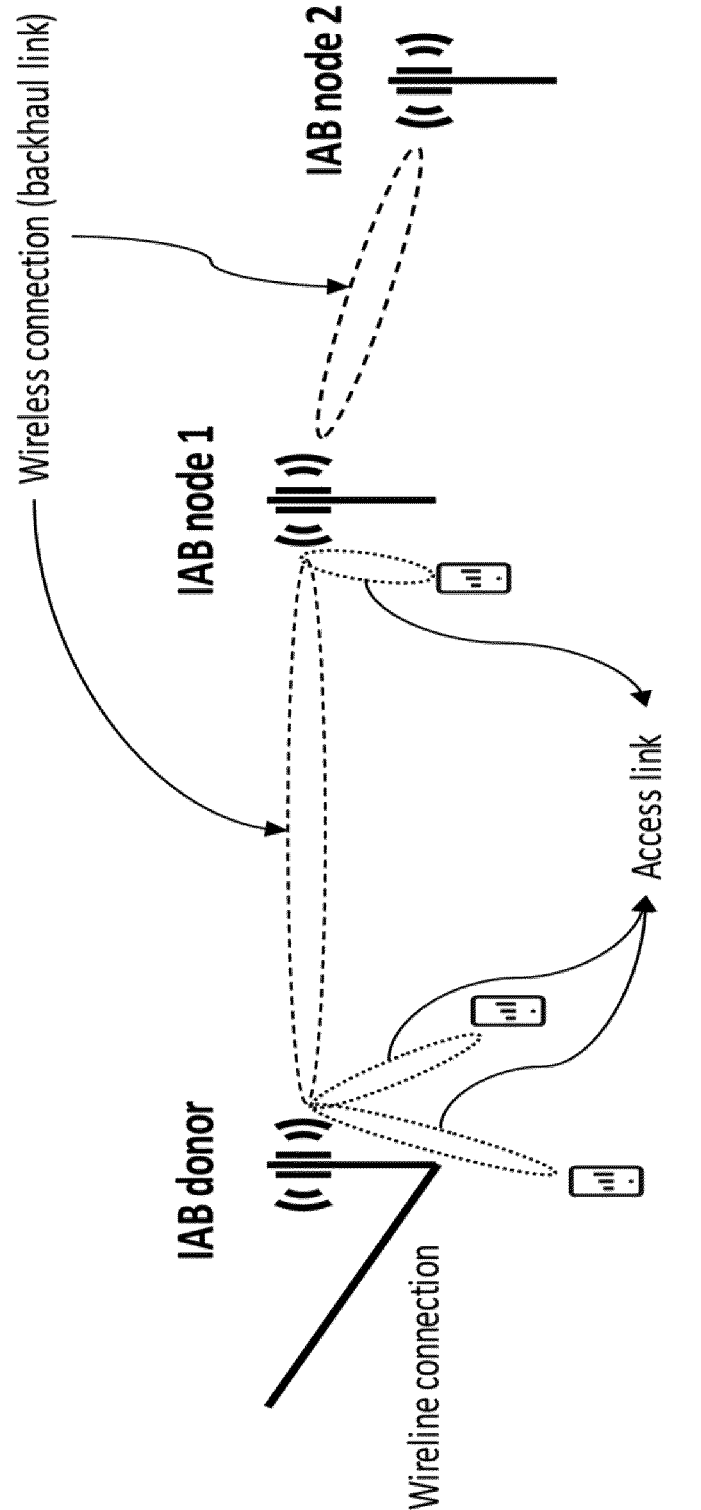
FIG. 1 depicts Multi-hop deployment in an integrated access and backhaul (IAB) network.
Figure 2:
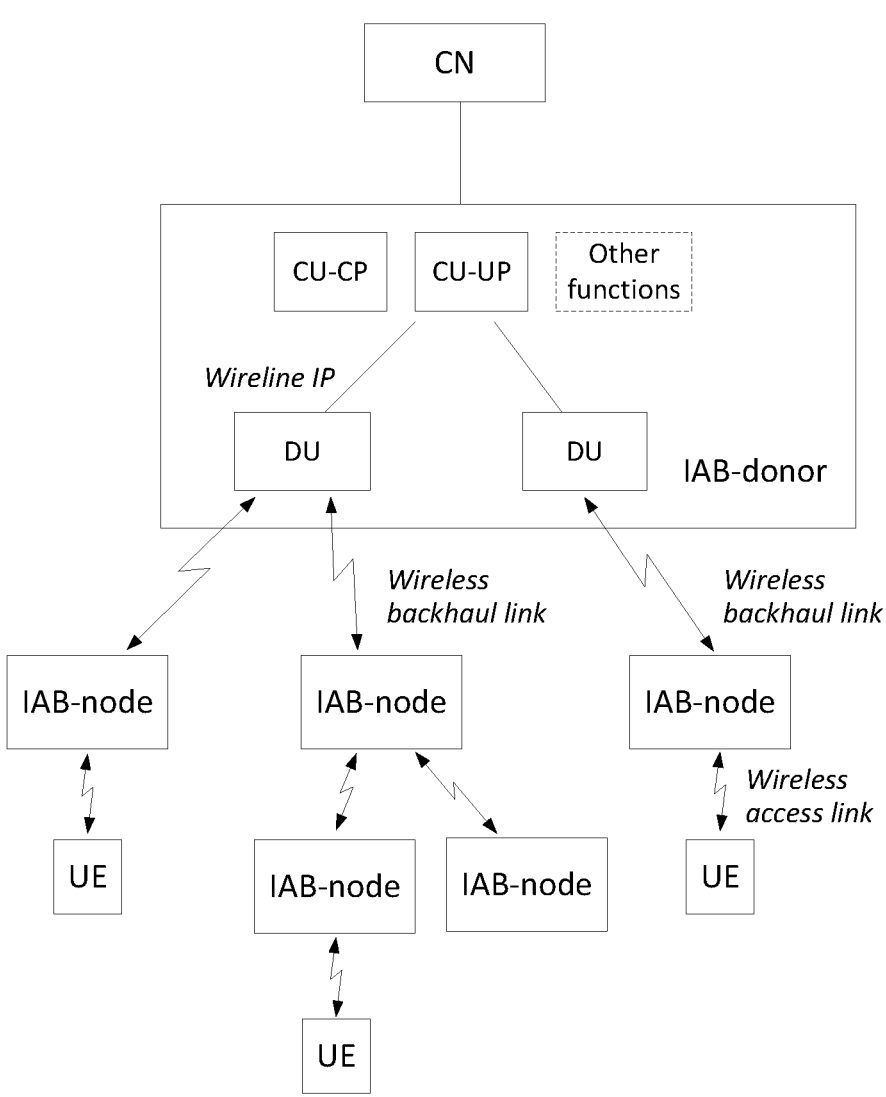
FIG. 2 shows IAB hierarchy.
Figure 3:
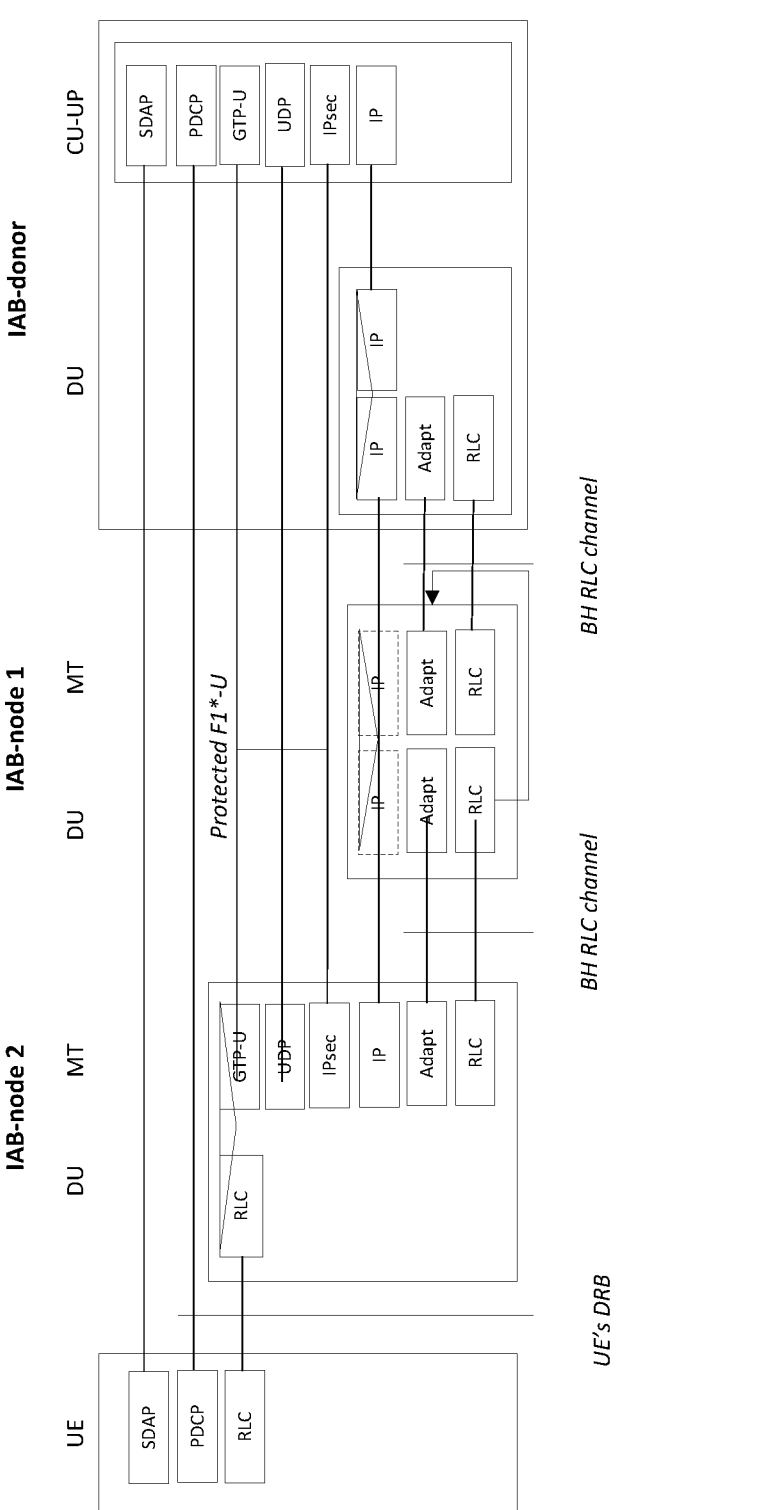
FIG. 3 shows a reference User Plane architecture according to embodiments of the present disclosure.
Figure 4:
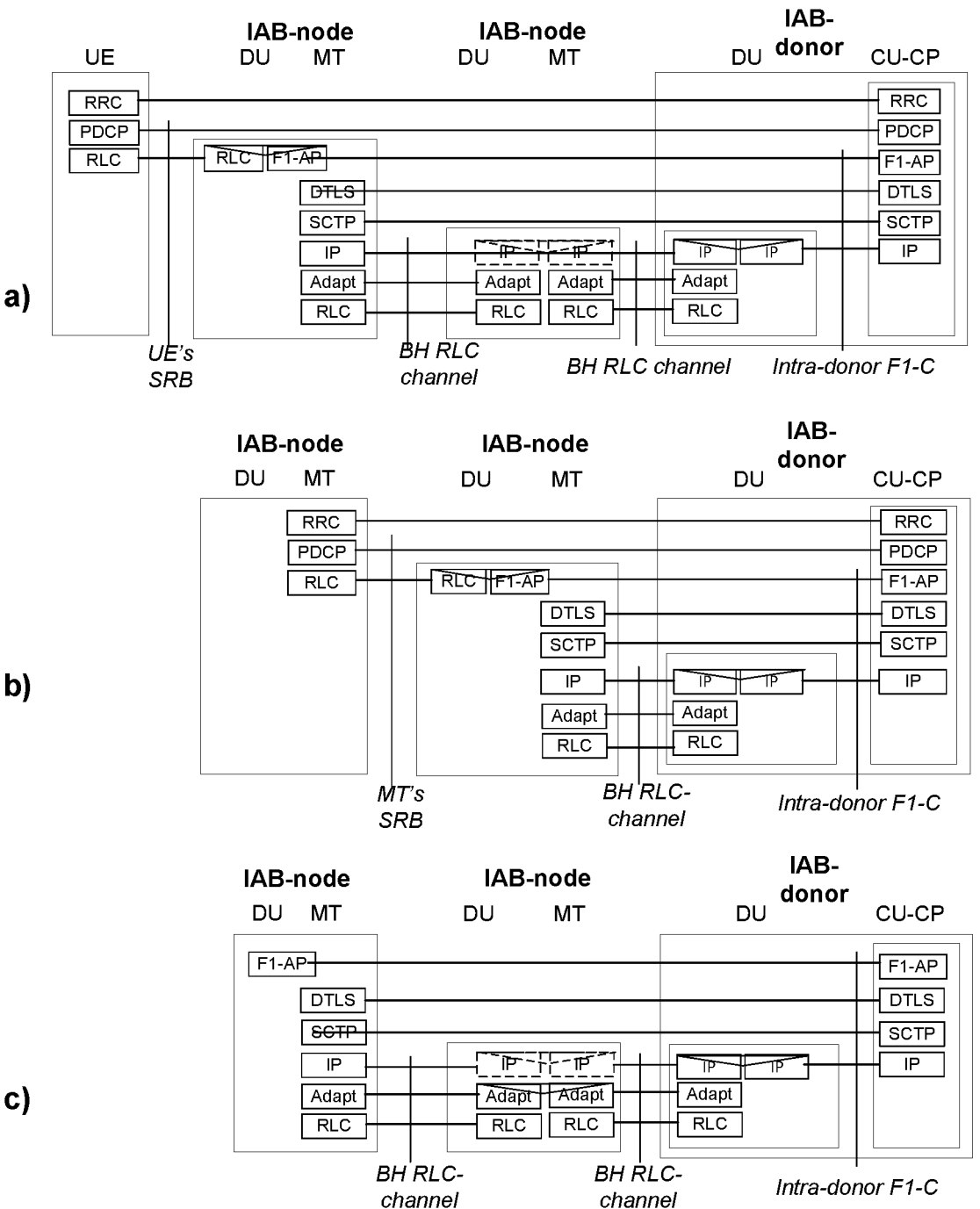
FIG. 4 shows examples of reference Control Plane architecture according to embodiments of the present disclosure.
Figure 5:
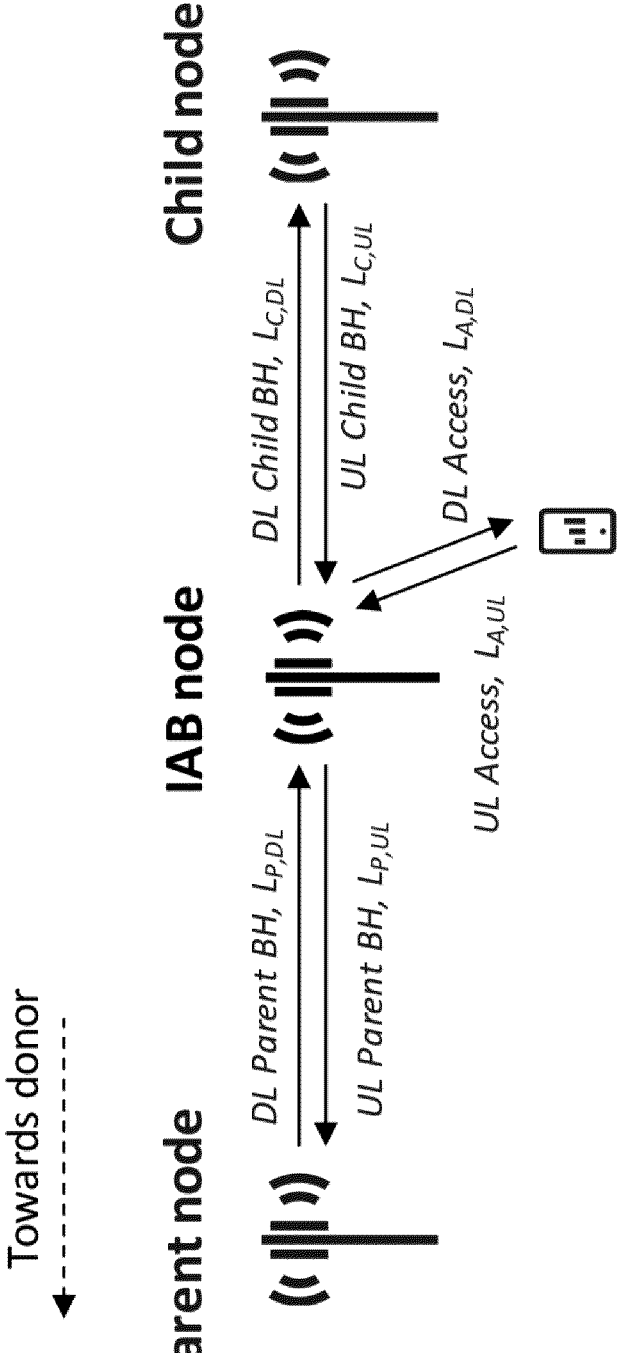
FIG. 5 shows a further example of IAB hierarchy.

For example, with reference to FIG. 5, which depicts a further example of an IAB hierarchy. When an IAB does handover (migrating an IAB node) or a backhaul (BH) link quality drops below a threshold some UEs and other downstream (child) IABs connected to this IAB node may declare radio link failure, this would cause a long service interruption. As RLF failure has to be notified to the UEs which then have to start the failure recovery procedure. The present disclosure considers solutions which avoid this situation, providing at least the advantage of reduced radio link failures.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. In particular, a network node may be comprised in a non-terrestrial network as part of a wireless communications system. A non-terrestrial network (NTN) comprises communications satellites and network nodes. The network nodes may be terrestrial or satellite based. For example, the network node may be a satellite gateway or a satellite based base station, e.g. gNB. Other examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In particular the wireless device may be involved in communication with a non-terrestrial network nodes, such as communications satellites and satellite based gateways or base stations. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Figure 6:
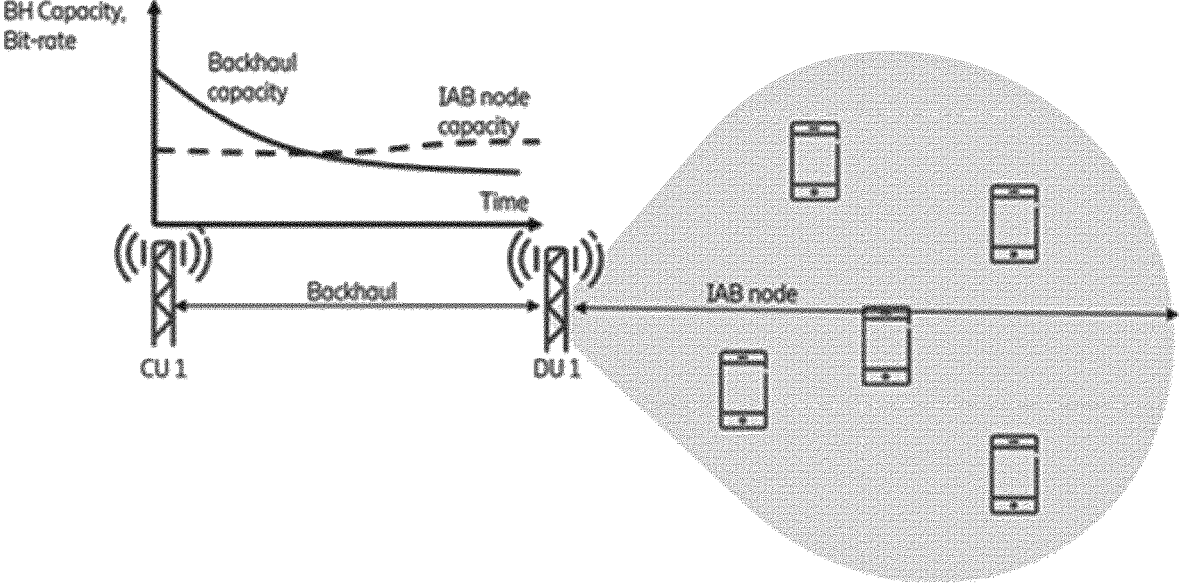
FIG. 6 shows example of the effect of a reduction in backhaul capacity.

FIG. 6 depicts how the backhaul capacity deteriorates to a level below the IAB node capacity. The method to adapt the IAB node's capacity to the backhaul current link capacity is as follows:

In one embodiment a first step is to lower the power on the synchronization signal physical broadcast channel (SSB)/CSI-RS and the referenceSignalPower which causes the cell border to decrease in size. This means that UEs' RSRP measurement will be decreased and since RSRP is typically used in mobility measurements, some cell edge UEs connected to the IAB node (and possible child IAB nodes) will make a handover to neighbouring nodes. The power is decreased until the necessary number of UEs has made a handover or until a minimum transmit power is reached.

The referenceSignalPower needs to be signaled to UEs which are not near the cell edge so that those UEs DL path loss estimate doesn't change relative to the previous SSB/CSI-RS and/or referenceSignalPower level although the monitored DL RSRP has decreased due to lower power on the SSB/CSI-RS. Those UEs will, as a result of the signalling indication, not increase their uplink transmission power via uplink power control. Since the backhaul link is degraded, this signaling is preferably not performed via the normal RRC which would need to be via the donor (and therefore using the BH capacity). Instead it is preferably performed for example, via medium access control (MAC) layer, e.g. a new MAC control element (CE) or downlink control information (DCI) based signalling. Compared to the existing signaling alternative (i.e., system information block (SIB) e.g. SIB1 or dedicated RRC signaling), the IAB node of the concerned BH link can signal in a fast manner to the relevant UEs (i.e., UEs determined not near to the cell edge) of change of the synchronization reference signals. Those UEs are then able to avoid increasing the UL transmission power although the measured RSRP has in reality decreased. The IAB node is able to determine UEs near to the cell border for example through positioning information (distance from the base station) or previously reported radio channel quality below a certain level or threshold.

In some examples, a second step could be performed, if the backhaul capacity is still lower than the IAB node capacity, where the transmit power of specific high data rate users is lowered. In some examples this is achieved by sending a cell-ulpc-offset to selected high data rate users, for example via MAC layer signalling (e.g. a new MAC-CE) which is applied, by the UE to the power per subband calculation in Equation. 2 above. In some examples this step may be repeated until the IAB node throughput is lower than the current BH capacity.

In other examples, the IAB node may send a DCI carrying a Transmit Power Control (TPC) command to selected UEs to adjust the transmission power for physical uplink shared channel (PUSCH). This method may be performed if the expected power adjustment is in a small range. If the expected power adjustment is large, the MAC CE based alternative would be faster in terms of latency.

As a result of one or more of the proposed embodiments, when a BH link radio quality becomes bad, which has a risk to cause BH RLF on the BH link of a path/route, the other hops (at least downstream links) of the path/route are adjusted accordingly to be aligned with the reduced BH link capacity. The adjustment ensures that a portion of the cell edge UEs can perform timely recovery actions (such as handover) and in some examples, if needed, high bit-rate UEs reduce their UL bitrate. At least one advantage with the latter is that by decreasing users UL bitrate, the cell adapts to the BH available capacity and lowers the interference in the IAB cell. These actions mean that the cell coverage is reduced in both the DL and the UL and can result in averting UEs from triggering a RLF. Further advantages are that an IAB node can take proper recovery actions for the BH RLF in good time to reduce latency while avoiding flooding other links with signaling distribution. With this approach a natural selection of targeting the cell edge users results without adversely affecting other UEs. By using direct signalling such as the proposed MAC CE and/or DCI based signaling, the IAB node of the concerned BH link can control the relevant UEs of change of the synchronization reference signals and/or the cell-ulpc-offset.in a fast manner, thus providing low latency/fast response to a detected BH capacity problem.

Figure 7:
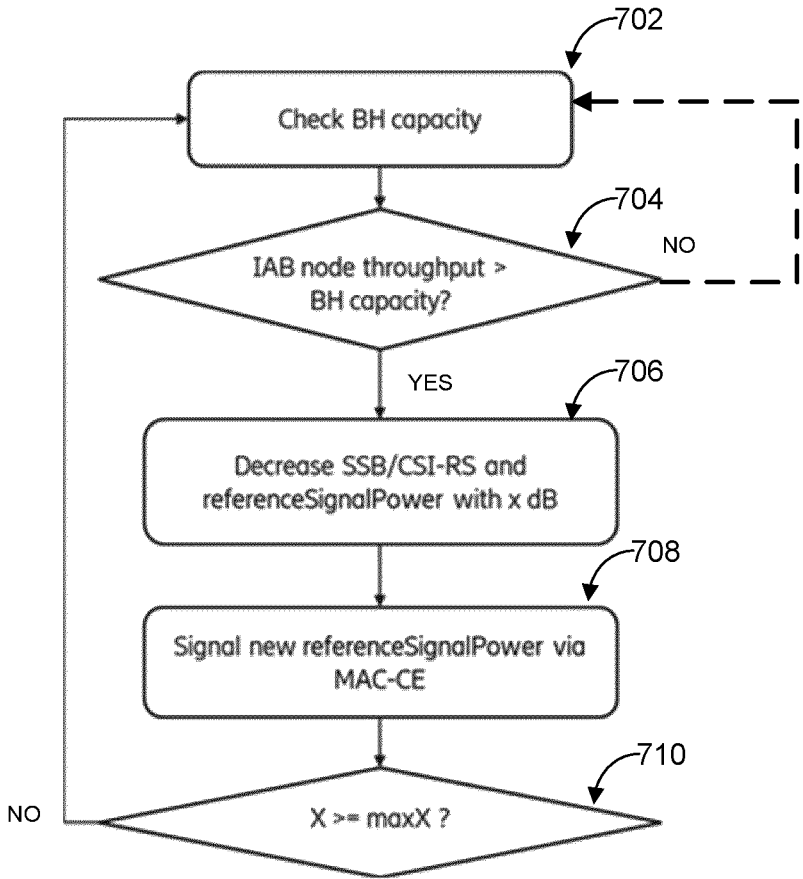
FIG. 7 shows an example process in accordance with an embodiment of the present disclosure.

An example embodiment is depicted in FIG. 7. The first step 702 is to obtain the BH capacity. The IAB node then at 704 compares the IAB throughput and the BH capacity. If the BH capacity can handle the wanted IAB node throughput (previously, for simplicity, also referred to as capacity, see for example, FIG. 6), if it can the comparison at 704 results in no changes being required. Step 702 may be repeated periodically or may be triggered due to certain thresholds being met. If the BH cannot handle the wanted IAB node throughput, i.e. the BH capacity is lower than the IAB node capacity at step 706, the IAB node decreases the SS/PBCH block and/or CSI-RS and the referenceSignalPower with x decibels (dB) in steps to force cell-edge users to make a handover to adjacent cells. The referenceSignalPower is signaled at step 708 via a new MAC-CE. It should be noted that by doing this only the RSRP measurements used in mobility are affected (decreased) and not the pathloss measurement used by the UL power control.

When the decrease of the SS/PBCH block and/or CSI-RS and the referenceSignalPower with x dB is performed, the IAB node wanted throughput is once again checked against the BH capacity and if necessary the SS/PBCH block and/or CSI-RS and the referenceSignalPower is decreased by x db again. Since the power cannot be decreased too much, there is a minimum transmit power, at step 710 the decrease x of the transmit power may be checked against a maximum value maxX dB and the process is only repeated if the power decrease is still within the allowed limit.

Figure 8:
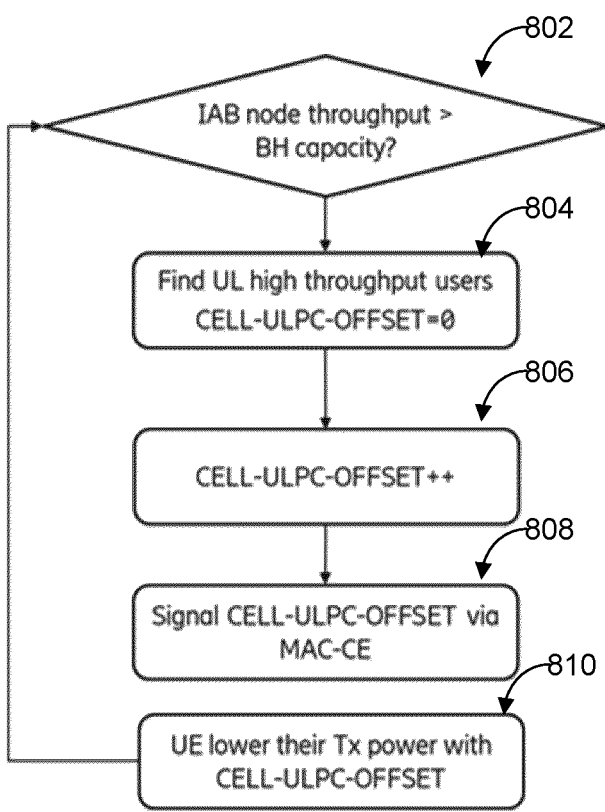
FIG. 8 shows an example example process in accordance with an embodiment of the present disclosure.

Another example embodiment is depicted in FIG. 8. The IAB node throughput is compared with the BH capacity at step 802. If the BH capacity is lower than the wanted IAB throughput, the IAB at step 804 finds high throughput users in the UL. In some examples the IAB determines the high throughput users as those with high buffer status report (BSR)/grant request. In other examples the high throughput users are determined based on a high amount of data buffered in the IAB node waiting to be sent on the BH link. The embodiment is not limited to these examples as many other means may be considered and provide the same advantageous effect. At step 806 the IAB node increments the Cell-ULPC-OFFSET and at step 808 the IAB transmits the value to the selected UEs. In some examples the Cell-ULPC-OFFSET is set to an initial value, for example 0. In some examples the signal is transmitted 806 as a MAC CE. This directs the selected UEs to decrease their UL transmit power. In some examples this is determined by the IAB at step 810. The process may then repeat to step 802. In some examples the repeat of the process is based on the determined UE Tx power. The Cell-ULPC-OFFSET is applied by the UE to the power per subband such as:

$$PSD=P0+a*PL-\text{Cell-ULPC-OFFSET} \qquad (5)$$

As mentioned above, the process may be repeated if the BH capacity is still lower than the IAB wanted throughput. The embodiment advantageously decreases a plurality of UEs requested throughput in an automated manner and also lowering the interference in the IAB cell due to the effective shrinking of the cell in both the DL and the UL.

One of more of the previously described embodiments proposes signaling referenceSignalPower and/or cell-ulpc-offset to selected wireless devices (UE or subordinate IAB node). According to the existing signaling alternatives in 3GPP, a gNB sends reference power level signaling to wireless devices through one or more of the following means:

1) to a plurality of UEs via SIB1 in a cell broadcast fashion.

2) to specific UEs via dedicated RRC signalling.

However, there are some drawbacks observed for the existing signaling alternatives. SIB1 is broadcast signalling which is transmitted at predefined time periods and is typically slow in comparison to a dedicated signalling method. Frequent transmission of SIB1 may lead to control signaling overhead and should thus be avoided. In addition, a UE in RRC connected mode would not read SIB1, which means that such a UE will not be able to receive the updated power information via SIB1. The reference power values are used by the UE to estimate its UL transmission power. Dedicated RRC signaling based alternatives have the problem that the RRC entities are terminated at the IAB donor and the UE. This means that the IAB donor is responsible for exchanging RRC signaling with the UE. For the proposed embodiments the IAB node of the concerned BH link would need to first inform the IAB donor of the relevant information before the donor can signal the UE via dedicated RRC. This would cause extra latency to the signalling and additional signalling load to the backhaul interfaces.

In some examples of the disclosed embodiments it is proposed that the IAB node signals the power level information via MAC layer (e.g. a MAC CE) or DCI based signalling.

In some examples this can be achieved using A MAC CE addressed to a UE-unique ID such as C-RNTI or a plurality of UEs through a group ID. In other examples a DCI may be used which is then also addressed to a UE unique ID such as C-RNTI or a plurality of UEs through a group ID.

For the MAC layer solution, a new MAC CE can be introduced to carry the ss-PBCH-BlockPower or powerControlOffsetSS.

Figure 9A:
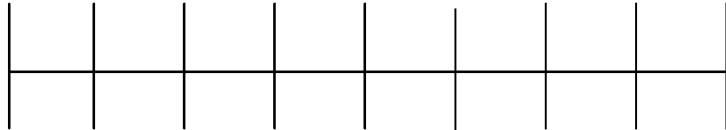
FIGS. 9a and 9b show an examples of a protocol enhancement according to one or more embodiments of the present disclosure.

In an example, as shown in FIG. 9a, the new MAC CE may contain only 1 octet to carry the referenceSignalPower. In the example, the referenceSignalPower field occupies 1 octet. In other examples, the referenceSignalPower field may take different length. In the example, depending on whether the referenceSignalPower is provided by ss-PBCH-BlockPower or by powerControlOffsetSS, the MAC CE carries either the value of ss-PBCH-BlockPower or the value of powerControlOffsetSS. When the UE receives the MAC CE, the UE can correctly interpret the received information since the UE has already learned the information on this via reading SIB signalling. In other words, the SIB1 may indicate if the value in the MAC CE is ss-PBCH-Block-Power or powerControlOffsetSS.

Figure 9B:

In another example, the new MAC CE may contain two fields to carry both ss-PBCH-BlockPower and powerControlOffsetSS. In a similar manner as in other examples, the two fields may use different lengths. If so, some reserved "R" bits may be defined. In case both fields are present, in another example, both fields may be placed in different order, i.e., the first octet carries the value of powerControlOffsetSS, while the second octet carries the value of ss-PBCH-BlockPower. An example of the MAC CE is shown in FIG. 9b.

In yet another example, indicators in the MAC subheader may be introduced to indicate whether ss-PBCH-Block-Power and/or powerControlOffsetSS is/are carried in the MAC CE. In this case, the UE may not need to read SIB signalling to obtain the setting of the reference signal power, i.e. whether the MAC CE carries either the value of ss-PBCH-BlockPower or the value of powerControlOffsetSS. It is enough for the UE to obtain the setting via the MAC CE. In any of the disclosed examples, a new LCID may be defined for the MAC CE.

For the DCI solution, in some examples one or two fields may be introduced in an existing DCI format (either UL DCI carrying UL grant or DL DCI carrying DL assignment, or group common DCI, or DCI carrying neither UL grant nor DL assignment). If the DCI contains a reserved "R" field, we can use some bits from the R field to carry the reference signal power. If there is no R field in the DCI signalling, the existing DCI format may be extended with new fields. In other examples, a new DCI format for signalling the reference signal power may be introduced.

Figure 10:
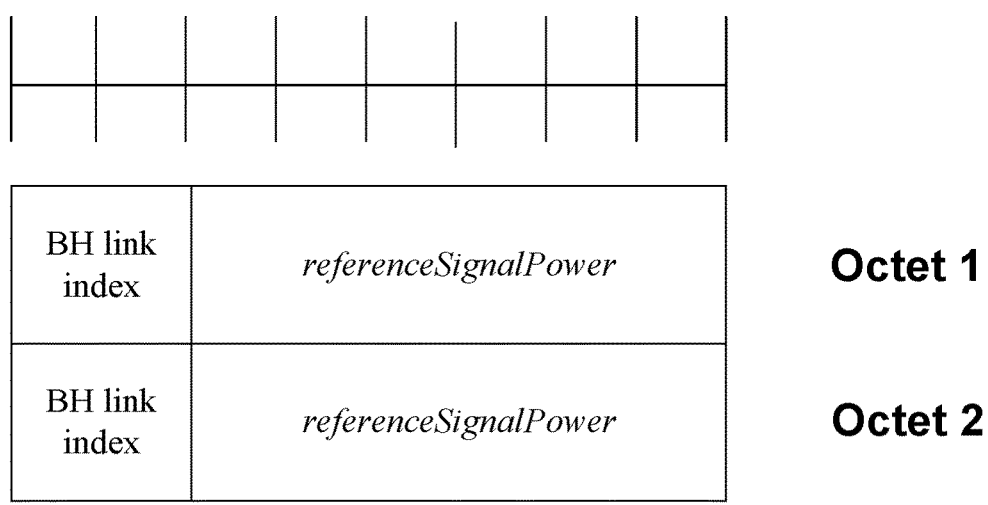
FIG. 10 shows an example of a protocol enhancement according to one or more embodiments of the present disclosure.

In some examples, a UE may be connected with multiple BH links. The IAB donor may configure the UE with separate SS/PBCH blocks and/or separate CSI-RSs on the downlink stream access link, and each of which is associated with a separate BH link. For any single BH link, any above embodiment is equally applicable. Where a new MAC CE is defined for carrying the reference signal power, the new MAC CE may also carry a BH link index for each BH link. In an example shown in FIG. 10, the new MAC CE can be defined so that it includes a referenceSignalPower octet for each BH link.

Figure 11:
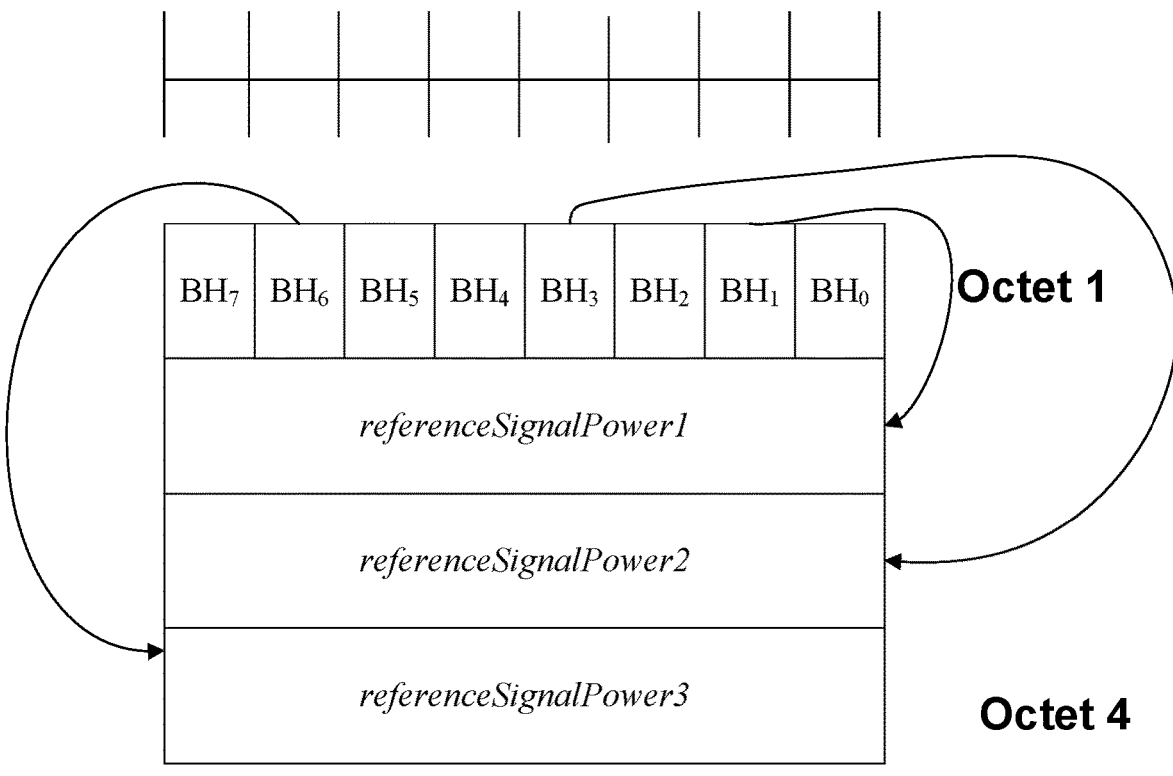
FIG. 11 shows an example of a protocol enhancement according to one or more embodiments of the present disclosure.

In another example as shown in FIG. 11, a bitmap field may be defined to indicate the BH link indices. Each bit is associated with a specific BH link. In some examples each bit takes the value '1' when indicating that the reference signal power is carried in the MAC CE for the corresponding BH link, while the bit takes the value '0' meaning that the reference signal power is not carried in the MAC CE for the corresponding BH link. In other examples the bit value/meaning may be reversed. In the example of FIG. 11, the referenceSignalPower octets are included in sequence order associated with the BH links to which they are associated, and thus in the example only 3 backhaul links out of a possible 8 BH links. The skilled person will understand that other means to achieve the disclosed embodiment without deviating from the essential aspects disclosed herein. For example further information may be required to associate each BH link with the bit in the bitmap. In other examples, the fields may have different lengths.

The proposed protocol enhancements are equally applicable for the signaling of the cell-ulpc-offset for example. In addition, any one of the embodiments exemplified by FIGS. 9 to 11 may be combined in one or more combinations, for example to indicate both referenceSignalPower(SSB) and referenceSignalPower(OffsetSS) on a per BH link basis.

To determine when the IAB node needs to adjust its transit power and the UL transmit power, the following triggers may be used:

The BH total throughput is lower than the total throughput of the IAB node. This may be measured as the sum of the throughput over all PRBs.

The BH radio link quality threshold (in terms of metrics such as RSRP, RSRQ, RSSI, SINR, out-of-synch indications) is below a threshold.

The BH latency is a threshold.

The BH link is compared to a downstream link. If the BH link provides lower capacity than the downstream link, adjustment of the downstream link can be enabled.

The above triggers may be used alone or a combination of triggers or thresholds may be employed.

The above described embodiments may be implemented as methods performed by an IAB node, a wireless device such as a UE or a subordinate IAB node, i.e. an IAB child node. The above described embodiments may alternatively be implemented by apparatus configured to perform one or more functions comprising one or more of the disclosed embodiments. These methods and apparatus will now be described in more detail in conjunction with the figures.

In FIG. 12, a method 1200 for adapting a serving cell capacity is performed by an integrated access and backhaul, IAB, node. The method begins with the IAB node determining 1202 a value corresponding to a backhaul link capacity. The IAB node then adapts 1204 a power level of the serving cell based on the determined value. The IAB node then signals 1206 to one or more served wireless devices information indicative of the adapted serving cell power level. In some examples of the method 1200 the power level comprises a reference signal power level. The reference signal power level may be at least one of SSB/CSI-RS power and referenceSignalPower. In some examples of the method 1200 the signalled information comprises a reference signal power parameter to indicate an adapted path loss level corresponding to the adapted serving cell power level which indicates to the one or more wireless device to maintain its uplink transmission power with respect to the adapted serving cell power level. In some examples of the method 1200 the signalling information is comprised in a medium access control, MAC, control element, CE, or in a downlink control information, DCI. In some examples of the method 1200 the one or more wireless devices are determined to be within a predefined distance from the served cell and/or with a radio channel quality above a certain level. In other words, the signalling information is not set to UEs determined to be "at the cell edge", or greater than a certain distance from the serving cell/with a radio channel quality below a certain level or threshold. In some examples of the method 1200, the method further comprises the IAB node sending to one or more wireless devices a transmit power level parameter to reduce the transmit power of the one or more wireless devices. The transmit power level parameter may be a cell uplink power control offset to be applied to a power per sub-band calculation to be performed by the one or more wireless devices. The signalling of the power level parameter causing a per wireless device reduction in uplink transmit power. The transmit power level parameter may in some examples be comprised in a MAC CE. In other examples the transmit power level parameter comprises a transmit power control, TPC, command in a DCI. In some examples of the method 1200 when the IAB node sends the transmit power level parameter, the one or more wireless devices are first determined to correspond to high data rate users as described previously. In some examples of the method 1200 when the IAB node sends the transmit power level parameter the method further comprises the IAB node determining a second value corresponding to the backhaul link capacity and sending to a further one or more wireless devices a transmit power level parameter to reduce the transmit power of the one or more wireless devices based on the determined second value corresponding to the backhaul link capacity. In other words, the IAB repeats the process. The signalling may be to the same wireless devices, a subset or the previously signalled wireless devices or a different one or more wireless devices. In some examples of the method 1200, the signalled information and/or signalled transmit power level further comprises a backhaul link identifier. As previously described, this may be indicated in different ways through protocol enhancement or extension. In any of the above described examples of the method 1200, the wireless device may be a UE or it may be another IAB node.

FIG. 13 is a method 1300 performed by a wireless device served by an integrated access and backhaul, IAB, node. The method begins with the wireless device receiving 1302 information indicating a change in serving cell power level, wherein the indication indicates the change is in response to a change in backhaul link capacity. The wireless device adapts 1304 an uplink transmit power based on the received indication. In some examples the power level comprises a reference signal power level. In some examples the reference signal power level is at least one of SSB/CSI-RS power and referenceSignalPower. In some examples the signalled information comprises a reference signal power parameter to indicate an adapted path loss level corresponding to the adapted serving cell power level indicative to the wireless device to maintain its uplink transmission power with respect to the adapted serving cell power level and the wireless device maintaining its uplink transmit power based on the received indication. In some examples the received information is comprised in a medium access control, MAC, control element, CE, or in a downlink control information, DCI. In some examples, the receiving of the information in a MAC CE or a DCI is the indication that the wireless device is to maintain its uplink transmission power with respect to the adapted serving cell power level. In some examples the received information comprises a transmit power level parameter to indicate to reduce the transmit power of the wireless device. The received information may comprise a cell uplink power control offset and the wireless adapting the uplink transmit power per sub-band calculation based on the cell uplink power control offset. In some examples the power per sub-band is calculated according to:

$$PSD = P0 + a*PL - \text{Cell-ULPC-OFFSET};$$

wherein P0=alfa*(sinrTarget+lin2db(noisePowerPerSub-band)+noiseRise)+(1−alfa)*(maximumPower−lin2db (M0))

parameter a is the fractional pathloss compensation factor where 1.0 means total compensation;

PL is the downlink path loss; and

M0=the default number of sub-bands or resource blocks.

In some examples of the method 1300, when the received information comprises a transmit power level parameter to indicate to reduce the transmit power of the wireless device the wireless device corresponds to a high data rate user. In some examples of the method 1300 the received information comprises a backhaul link identifier. In any of the examples of the method 1300 the wireless device may be a UE or it may be another IAB node, i.e a subordinate IAB node or child IAB node. As previously described the received information comprising a transmit power level parameter to indicate to reduce the transmit power of the wireless device may also be comprised in a medium access control, MAC, control element, CE, or in a downlink control information, DCI. In some examples the transmit power level parameter comprises a transmit power control, TPC, command in a DCI.

Figure 14:
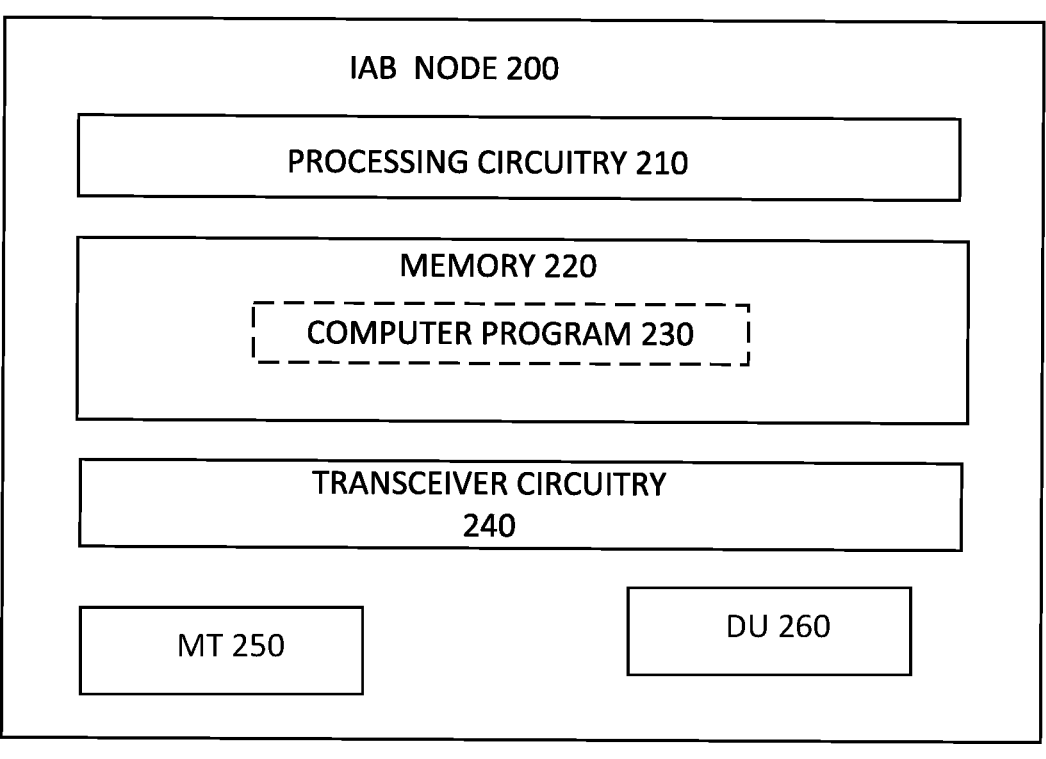
FIG. 14 is a block diagram illustrating an example IAB node according to one or more embodiments of the present disclosure.

FIG. 14 illustrates and example IAB node 200. The IAB node may comprise a number of logical functional units, for example processing circuitry 210, memory 220 comprising a computer program 230, transceiver circuitry 240 for transmitting and receiving signals for example to/from a parent IAB node, a child IAB node and/or wireless devices, mobile termination (MT) 250 and distribution unit (DU) 260.

In some embodiments the processing circuitry 210 is configured to determine a value corresponding to a backhaul link capacity. The processing circuitry 210 is further configured to adapt a power level of the serving cell based on the determined value. The processing circuitry 210 is further configured to signal via the transceiver circuitry 240 to one or more served wireless devices information indicative of the adapted serving cell power level. In some examples the power level comprises a reference signal power level. The reference signal power level may be at least one of SSB/CSI-RS power and referenceSignalPower. In some examples the signalled information comprises a reference signal power parameter to indicate an adapted path loss level corresponding to the adapted serving cell power level which indicates to the one or more wireless device to maintain its uplink transmission power with respect to the adapted serving cell power level. In some examples the signalling information is comprised in a medium access control, MAC, control element, CE, or in a downlink control information, DCI. In some examples the one or more wireless devices are determined to be within a predefined distance from the served cell and/or with a radio channel quality above a certain level. In other words, the signalling information is not set to UEs determined to be "at the cell edge", or greater than a certain distance from the serving cell/with a radio channel quality below a certain level or threshold. In some examples the processing circuitry 210 is further configured to signal via the transceiver circuitry 240 to one or more wireless devices a transmit power level parameter to reduce the transmit power of the one or more wireless devices. The transmit power level parameter may be a cell uplink power control offset to be applied to a power per sub-band calculation to be performed by the one or more wireless devices. The signalling of the power level parameter causing a per wireless device reduction in uplink transmit power. The transmit power level parameter may in some examples be comprised in a MAC CE. In other examples the transmit power level parameter comprises a transmit power control, TPC, command in a DCI. In some examples when the IAB node sends the transmit power level parameter, the one or more wireless devices are first determined to correspond to high data rate users as described previously. In some examples when the IAB node sends the transmit power level parameter the processing circuitry is further configured to determine a second value corresponding to the backhaul link capacity and to send via the transceiver circuitry 240 to a further one or more wireless devices a transmit power level parameter to reduce the transmit power of the one or more wireless devices based on the determined second value corresponding to the backhaul link capacity. In other words, the IAB repeats the process. The signalling may be to the same wireless devices, a subset or the previously signalled wireless devices or a different one or more wireless devices.

In some examples the signalled information and/or signalled transmit power level further comprises a backhaul link identifier. As previously described, this may be indicated in different ways through protocol enhancement or extension. In any of the above described examples the wireless device may be a UE or it may be another IAB node.

Figure 15:
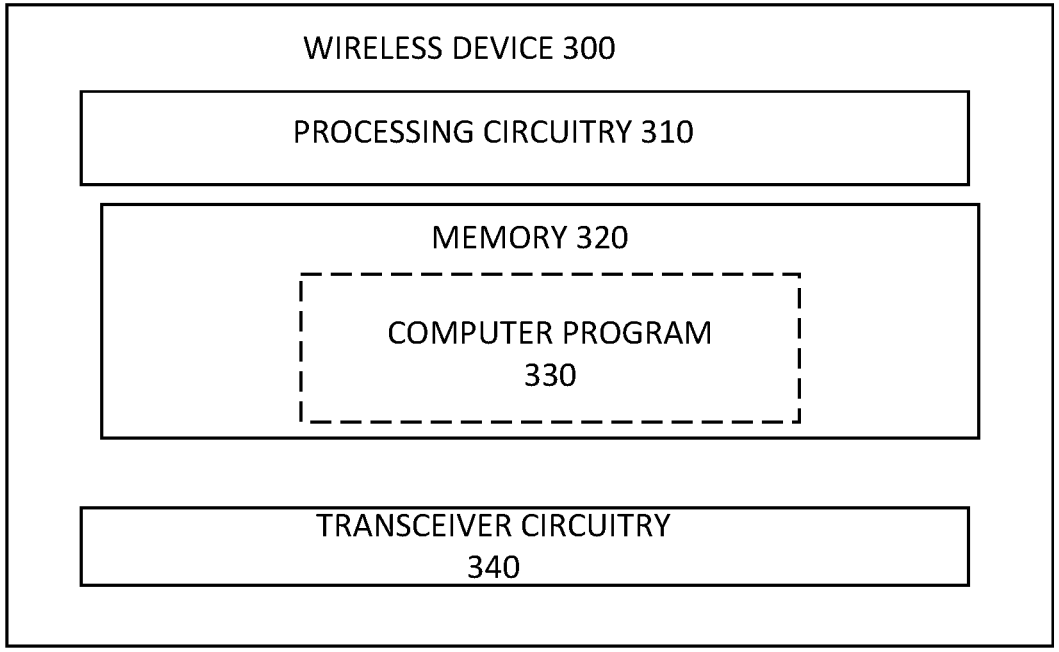
FIG. 15 is a block diagram illustrating an example wireless device according to one or more embodiments of the present disclosure.

FIG. 15 illustrates an example wireless device 300. The wireless device 300 may comprise a number of logical functional units, for example processing circuitry 310, memory 320 comprising a computer program 330, transceiver circuitry 340 for transmitting and receiving signals for example to/from the serving IAB node.

In some embodiments the processing circuitry 310 is configured to receive, via the transceiver circuitry 340 information indicating a change in serving cell power level, wherein the indication indicates the change is in response to a change in backhaul link capacity. The processing circuitry 310 is configured to adapt an uplink transmit power based on the received indication. In some examples the power level comprises a reference signal power level. In some examples the reference signal power level is at least one of SSB/CSI-RS power and referenceSignalPower. In some examples the received information comprises a reference signal power parameter to indicate an adapted path loss level corresponding to the adapted serving cell power level indicative to the wireless device to maintain its uplink transmission power with respect to the adapted serving cell power level and the processing circuitry 310 is configured to maintain its uplink transmit power based on the received indication. In some examples the received information is comprised in a medium access control, MAC, control element, CE, or in a downlink control information, DCI. In some examples, the receiving of the information in a MAC CE or a DCI is the indication that the wireless device is to maintain its uplink transmission power with respect to the adapted serving cell power level. In some examples the received information comprises a transmit power level parameter to indicate to reduce the transmit power of the wireless device. The received information may comprise a cell uplink power control offset and the wireless adapting the uplink transmit power per sub-band calculation based on the cell uplink power control offset. In some examples the power per sub-band is calculated according to:

$$PSD=P0+a*PL-\text{Cell-ULPC-OFFSET};$$

wherein P0=alfa*(sinrTarget+lin2db(noisePowerPerSubband)+noiseRise)+(1−alfa)*(maximumPower−lin2db(M0))
parameter a is the fractional pathloss compensation factor where 1.0 means total compensation;
PL is the downlink path loss; and
M0=the default number of sub-bands or resource blocks.

In some examples when the received information comprises a transmit power level parameter to indicate to reduce the transmit power of the wireless device the wireless device corresponds to a high data rate user. In some examples the received information comprises a backhaul link identifier. In any of the examples the wireless device 300 may be a UE or it may be another IAB node, i.e a subordinate IAB node or child IAB node. As previously described the received information comprising a transmit power level parameter to indicate to reduce the transmit power of the wireless device may also be comprised in a medium access control, MAC, control element, CE, or in a downlink control information, DCI. In some examples the transmit power level parameter comprises a transmit power control, TPC, command in a DCI.

Figure 16:
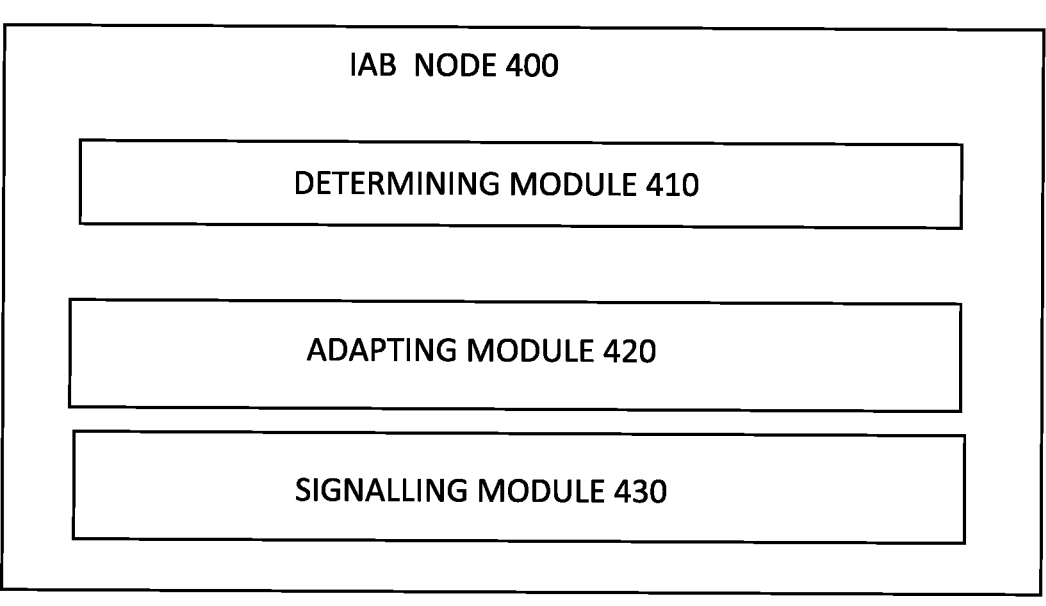
FIG. 16 is a block diagram illustrating an example IAB node comprising software modules according to one or more embodiments of the present disclosure.

FIG. 16 is a block diagram illustrating an example IAB node 400 comprising software modules according to one or more embodiments of the present disclosure. The determining module 410 may be configured to perform one or more of the methods previously described for determining a value corresponding to a backhaul link capacity. The adapting module 420 may be configured to perform one or more of the methods previously described for a power level of the serving cell based on the determined value. The signaling module 430 may be configured to perform any one of the methods previously described for transmitting signaling, for example to signal to one or more served wireless devices information indicative of the adapted serving cell power level.

Figure 17:
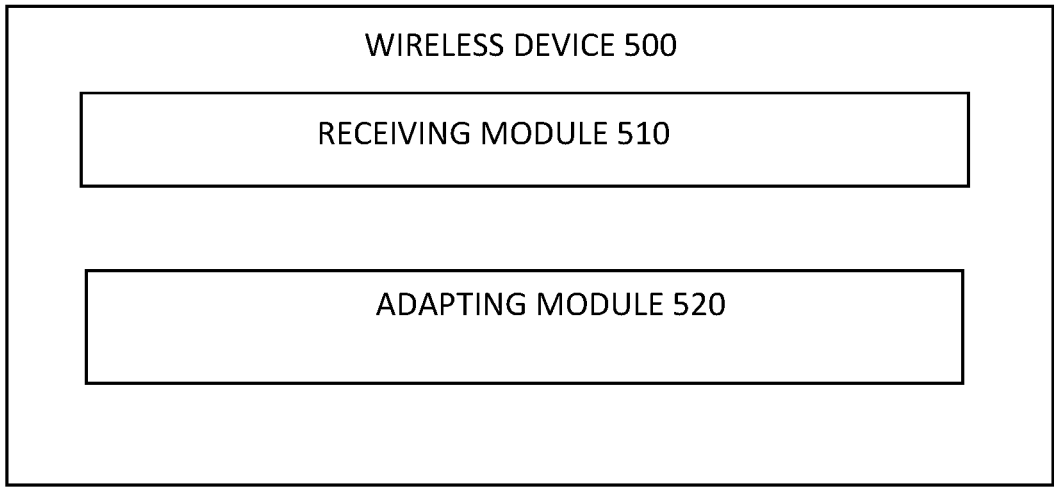
FIG. 17 is a block diagram illustrating an example wireless device comprising software modules according to one or more embodiments of the present disclosure.

FIG. 17 is a block diagram illustrating an example wireless device 500 comprising software modules according to one or more embodiments of the present disclosure. Receiving module 510 may be configured to perform one or more of the methods previously described for receiving information indicating a change in serving cell power level, wherein the indication indicates the change is in response to a change in backhaul link capacity. Adapting module 520 may be configured to perform one or more of the methods previously described for adapting an uplink transmit power based on the received indication.

Figure 18:
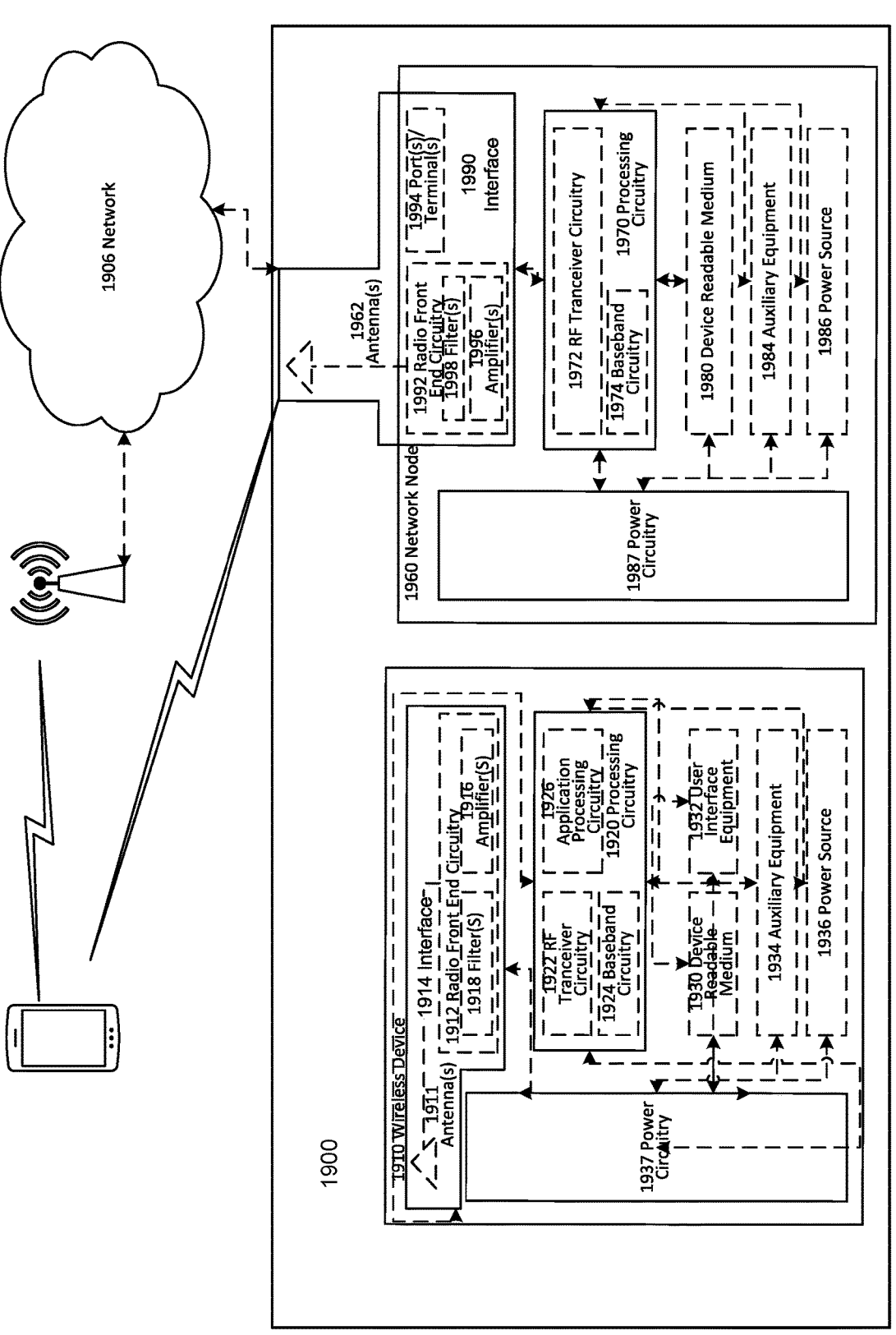
FIG. 18 is a block diagram illustrating an example network node according to one or more embodiments of the present disclosure.

FIG. 18 depicts an example structure of an IAB node 1900 comprising MT 1910 and DU 1960 entities. The DU entities are depicted separated to highlight the independence of the functions. Although the subject matter described herein may be implemented in any appropriate type of system using any suitable components, the embodiments disclosed herein are described in relation to a wireless network, such as the example wireless network illustrated in FIG. 19. In practice, a wireless network may further include any additional elements suitable to support communication between wireless devices or between a wireless device and another communication device, such as a landline telephone, a service provider, or any other network node or end device. Of the illustrated components, DU 1960 and MT 1910 are depicted with additional detail. It should be noted that these functions may be logically and/or physically separated or combined within an IAB node. The wireless network may provide communication and other types of services to one or more wireless devices to facilitate the wireless devices' access to and/or use of the services provided by, or via, the IAB node 1900.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

DU 1960 and MT 1910 comprise various components described in more detail below. These components work together in order to provide IAB node 1900 functionality, such as providing wireless connections in a wireless network. Specifically, the entities described in further detail below are suitable to provide one or more of the embodiments disclosed herein.

In different embodiments, the wireless network may comprise any number of wired or wireless networks, IAB nodes, other network nodes, base stations, controllers, wireless devices, relay stations, and/or any other components or systems that may facilitate or participate in the communication of data and/or signals whether via wired or wireless connections.

As used herein, DU refers to equipment capable, configured, arranged and/or operable to communicate directly or indirectly with a wireless device and/or with other IAB nodes or equipment in the wireless network to enable and/or provide wireless access to the wireless device and/or to perform other functions (e.g., administration) in the wireless network. Examples of other network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 18, DU 1960 includes processing circuitry 1970, device readable medium 1980, interface 1990, auxiliary equipment 1984, power source 1986, power circuitry 1987, and antenna 1962. Although DU 1960 illustrated in the example wireless network of FIG. 19 may represent a device that includes the illustrated combination of hardware components, other embodiments may comprise DUs with different combinations of components. It is to be understood that a DU comprises any suitable combination of hardware and/or software needed to perform the tasks, features, functions and methods disclosed herein. Moreover, while the components of DU 1960 are depicted as single boxes located within a larger box, or nested within multiple boxes, in practice, a DU may comprise multiple different physical components that make up a single illustrated component (e.g., device readable medium 1980 may comprise multiple separate hard drives as well as multiple RAM modules).

Similarly, DU 1960 may be composed of multiple physically separate components which may each have their own respective components. In some embodiments, DU 1960 may be configured to support multiple radio access technologies (RATs). In such embodiments, some components may be duplicated (e.g., separate device readable medium 1980 for the different RATs) and some components may be reused (e.g., the same antenna 1962 may be shared by the RATs). DU 1960 may also include multiple sets of the various illustrated components for different wireless technologies integrated into DU 1960, such as, for example, GSM, WCDMA, LTE, NR, WiFi, or Bluetooth wireless technologies. These wireless technologies may be integrated into the same or different chip or set of chips and other components within DU 1960.

Processing circuitry 1970 is configured to perform any determining, calculating, or similar operations (e.g., certain obtaining operations) described herein as being provided by a DU. These operations performed by processing circuitry 1970 may include processing information obtained by processing circuitry 1970 by, for example, converting the obtained information into other information, comparing the obtained information or converted information to information stored in the DU, and/or performing one or more operations based on the obtained information or converted information, and as a result of said processing making a determination.

Processing circuitry 1970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other DU 1960 components, such as device readable medium 1980, DU 1960 functionality. For example, processing circuitry 1970 may execute instructions stored in device readable medium 1980 or in memory within processing circuitry 1970. Such functionality may include providing any of the various wireless features, functions, or benefits discussed herein. In some embodiments, processing circuitry 1970 may include a system on a chip (SOC).

In some embodiments, processing circuitry 1970 may include one or more of radio frequency (RF) transceiver circuitry 1972 and baseband processing circuitry 1974. In some embodiments, radio frequency (RF) transceiver circuitry 1972 and baseband processing circuitry 1974 may be on separate chips (or sets of chips), boards, or units, such as radio units and digital units. In alternative embodiments, part or all of RF transceiver circuitry 1972 and baseband processing circuitry 1974 may be on the same chip or set of chips, boards, or units.

In certain embodiments, some or all of the functionality described herein as being provided by an IAB node may be performed by processing circuitry 1970 executing instructions stored on device readable medium 1980 or memory within processing circuitry 1970. In alternative embodiments, some or all of the functionality may be provided by processing circuitry 1970 without executing instructions stored on a separate or discrete device readable medium, such as in a hard-wired manner. In any of those embodiments, whether executing instructions stored on a device readable storage medium or not, processing circuitry 1970 can be configured to perform the described functionality. The benefits provided by such functionality are not limited to processing circuitry 1970 alone or to other components of network node 1960, but are enjoyed by network node 1960 as a whole, and/or by end users and the wireless network generally.

Device readable medium 1980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1970. Device readable medium 1980 may store any suitable instructions, data or information, including a computer program, software, an application including one or more of logic, rules, code, tables, etc. and/or other instructions capable of being executed by processing circuitry 1970 and, utilized by network node 1960. Device readable medium 1980 may be used to store any calculations made by processing circuitry 1970 and/or any data received via interface 1990. In some embodiments, processing circuitry 1970 and device readable medium 1980 may be considered to be integrated.

Interface 1990 is used in the wired or wireless communication of signalling and/or data between the IAB node and other network nodes. As illustrated, interface 1990 comprises port(s)/terminal(s) 1994 to send and receive data, for example to and from network 1906 over a wired connection. Interface 1990 also includes radio front end circuitry 1992 that may be coupled to, or in certain embodiments a part of, antenna 1962. Radio front end circuitry 1992 comprises filters 1998 and amplifiers 1996. Radio front end circuitry 1992 may be connected to antenna 1962 and processing circuitry 1970. Radio front end circuitry may be configured to condition signals communicated between antenna 1962 and processing circuitry 1970. Radio front end circuitry 1992 may receive digital data that is to be sent out to other network nodes or wireless devices via a wireless connection. Radio front end circuitry 1992 may convert the digital data into a radio signal having the appropriate channel and bandwidth parameters using a combination of filters 1998 and/or amplifiers 1996. The radio signal may then be transmitted via antenna 1962. Similarly, when receiving data, antenna 1962 may collect radio signals which are then converted into digital data by radio front end circuitry 1992. The digital data may be passed to processing circuitry 1970. In other embodiments, the interface may comprise different components and/or different combinations of components.

In certain alternative embodiments, DU 1960 may not include separate radio front end circuitry 1992, instead, processing circuitry 1970 may comprise radio front end circuitry and may be connected to antenna 1962 without separate radio front end circuitry 1992. Similarly, in some embodiments, all or some of RF transceiver circuitry 1972 may be considered a part of interface 1990. In still other embodiments, interface 1990 may include one or more ports or terminals 1994, radio front end circuitry 1992, and RF transceiver circuitry 1972, as part of a radio unit (not shown), and interface 1990 may communicate with baseband processing circuitry 1974, which is part of a digital unit (not shown).

Antenna 1962 may include one or more antennas, or antenna arrays, configured to send and/or receive wireless signals. Antenna 1962 may be coupled to radio front end circuitry 1990 and may be any type of antenna capable of transmitting and receiving data and/or signals wirelessly. In some embodiments, antenna 1962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1962 may be separate from DU 1960 and may be connectable to DU 1960 through an interface or port.

Antenna 1962, interface 1990, and/or processing circuitry 1970 may be configured to perform any receiving operations and/or certain obtaining operations described herein as being performed by an IAB node. Any information, data and/or signals may be received from a wireless device, another IAB node or network node and/or any other network equipment. Similarly, antenna 1962, interface 1990, and/or processing circuitry 1970 may be configured to perform any transmitting operations described herein as being performed by an IAB node. Any information, data and/or signals may be transmitted to a wireless device, another IAB node or other network node and/or any other network equipment.

Power circuitry 1987 may comprise, or be coupled to, power management circuitry and is configured to supply the components of DU 1960 with power for performing the functionality described herein. Power circuitry 1987 may receive power from power source 1986. Power source 1986 and/or power circuitry 1987 may be configured to provide power to the various components of DU 1960 in a form suitable for the respective components (e.g., at a voltage and current level needed for each respective component). Power source 1986 may either be included in, or external to, power circuitry 1987 and/or DU 1960. For example, DU 1960 may be connectable to an external power source (e.g., an electricity outlet) via an input circuitry or interface such as an electrical cable, whereby the external power source supplies power to power circuitry 1987. As a further example, power source 1986 may comprise a source of power in the form of a battery or battery pack which is connected to, or integrated in, power circuitry 1987. The battery may provide backup power should the external power source fail. Other types of power sources, such as photovoltaic devices, may also be used.

Figure 19:
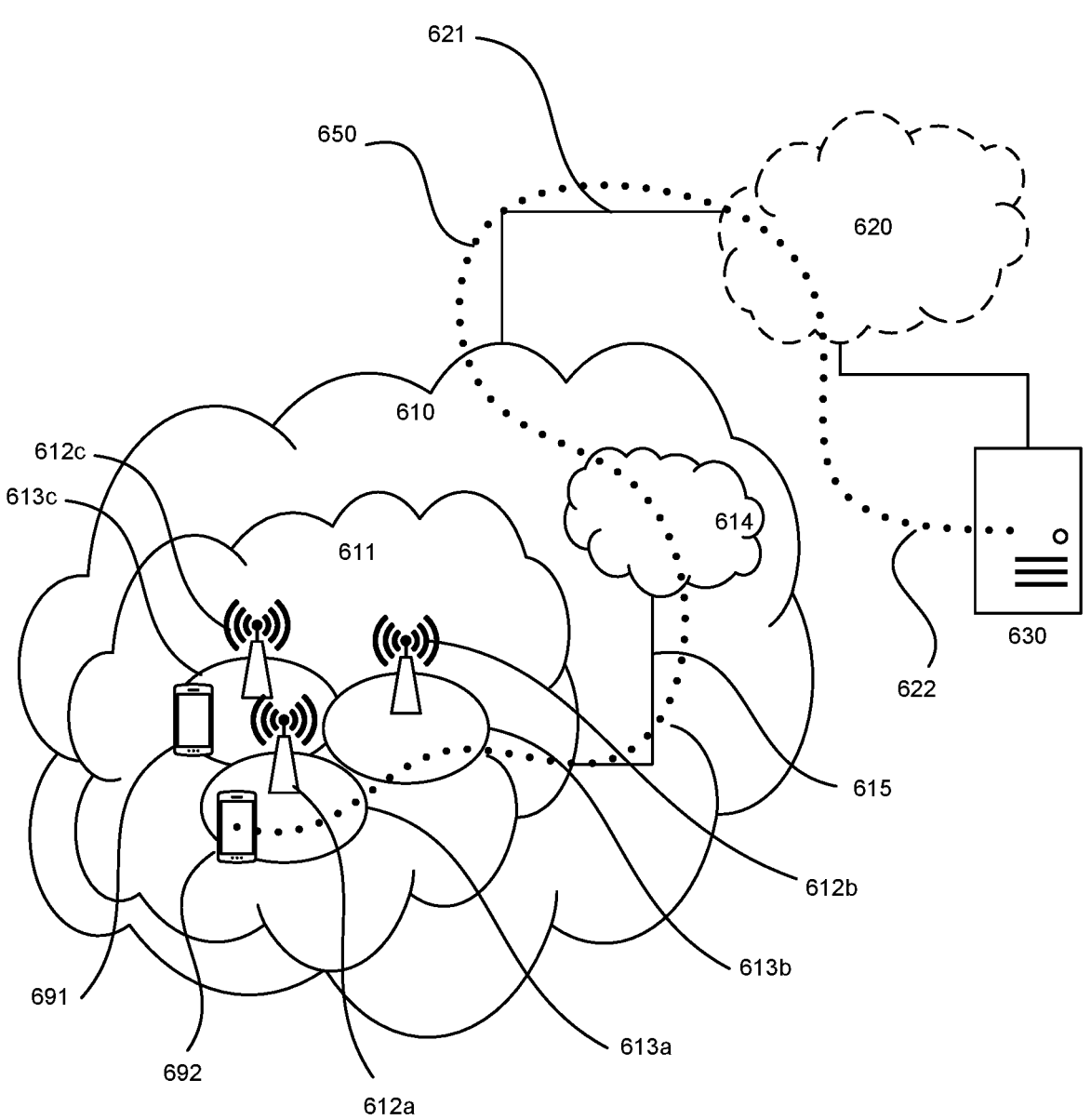
FIG. 19 schematically illustrates a telecommunication network connected via an intermediate network to a host computer.

Alternative embodiments of IAB node may include additional components beyond those shown in FIG. 19 that may be responsible for providing certain aspects of the IAB node's functionality, including any of the functionality described herein and/or any functionality necessary to support the subject matter described herein. For example, IAB node may include user interface equipment to allow input of information into the IAB node and to allow output of information from IAB node. This may allow a user to perform diagnostic, maintenance, repair, and other administrative functions.

As used herein, wireless device refers to a device capable, configured, arranged and/or operable to communicate wirelessly with network nodes and/or other wireless devices. Unless otherwise noted, the term wireless device may be used interchangeably herein with user equipment (UE).

Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, MT 1910 may include antenna 1911, interface 1914, processing circuitry 1920, device readable medium 1930, user interface equipment 1932, auxiliary equipment 1934, power source 1936 and power circuitry 1937. MT 1910 may include multiple sets of one or more of the illustrated components for different wireless technologies supported by MT 1910, such as, for example, GSM, WCDMA, LTE, NR, WiFi, WiMAX, or Bluetooth wireless technologies, just to mention a few. These wireless technologies may be integrated into the same or different chips or set of chips as other components within MT 1910.

Antenna 1911 may include one or more antennas or antenna arrays, configured to send and/or receive wireless signals, and is connected to interface 1914. In certain alternative embodiments, antenna 1911 may be separate from MT 1910 and be connectable to MT 1910 through an interface or port. Antenna 1911, interface 1914, and/or processing circuitry 1920 may be configured to perform any receiving or transmitting operations described herein as being performed by a DU. Any information, data and/or signals may be received from a network node and/or another DU. In some embodiments, radio front end circuitry and/or antenna 1911 may be considered an interface.

As illustrated, interface 1914 comprises radio front end circuitry 1912 and antenna 1911. Radio front end circuitry 1912 comprise one or more filters 1918 and amplifiers 1916. Radio front end circuitry 1914 is connected to antenna 1911 and processing circuitry 1920, and is configured to condition signals communicated between antenna 1911 and processing circuitry 1920. Radio front end circuitry 1912 may be coupled to or a part of antenna 1911. In some embodiments, MT 1910 may not include separate radio front end circuitry 1912; rather, processing circuitry 1920 may comprise radio front end circuitry and may be connected to antenna 1911. Similarly, in some embodiments, some or all of RF transceiver circuitry 1922 may be considered a part of interface 1914. Radio front end circuitry 1912 may receive digital data that is to be sent out to other network nodes or DUs via a wireless connection. Radio front end circuitry 1912 may convert the digital data into a radio signal having the appropriate channel and bandwidth parameters using a combination of filters 1918 and/or amplifiers 1916. The radio signal may then be transmitted via antenna 1911. Similarly, when receiving data, antenna 1911 may collect radio signals which are then converted into digital data by radio front end circuitry 1912. The digital data may be passed to processing circuitry 1920. In other embodiments, the interface may comprise different components and/or different combinations of components.

Processing circuitry 1920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other MT 1910 components, such as device readable medium 1930, MT 1910 functionality. Such functionality may include providing any of the various wireless features or benefits discussed herein. For example, processing circuitry 1920 may execute instructions stored in device readable medium 1930 or in memory within processing circuitry 1920 to provide the functionality disclosed herein.

As illustrated, processing circuitry 1920 includes one or more of RF transceiver circuitry 1922, baseband processing circuitry 1924, and application processing circuitry 1926. In other embodiments, the processing circuitry may comprise different components and/or different combinations of components. In certain embodiments processing circuitry 1920 of MT 1910 may comprise a SOC. In some embodiments, RF transceiver circuitry 1922, baseband processing circuitry 1924, and application processing circuitry 1926 may be on separate chips or sets of chips. In alternative embodiments, part or all of baseband processing circuitry 1924 and application processing circuitry 1926 may be combined into one chip or set of chips, and RF transceiver circuitry 1922 may be on a separate chip or set of chips. In still alternative embodiments, part or all of RF transceiver circuitry 1922 and baseband processing circuitry 1924 may be on the same chip or set of chips, and application processing circuitry 1926 may be on a separate chip or set of chips. In yet other alternative embodiments, part or all of RF transceiver circuitry 1922, baseband processing circuitry 1924, and application processing circuitry 1926 may be combined in the same chip or set of chips. In some embodiments, RF transceiver circuitry 1922 may be a part of interface 1914. RF transceiver circuitry 1922 may condition RF signals for processing circuitry 1920.

In certain embodiments, some or all of the functionality described herein as being performed by a DU may be provided by processing circuitry 1920 executing instructions stored on device readable medium 1930, which in certain embodiments may be a computer-readable storage medium. In alternative embodiments, some or all of the functionality may be provided by processing circuitry 1920 without executing instructions stored on a separate or discrete device readable storage medium, such as in a hard-wired manner. In any of those particular embodiments, whether executing instructions stored on a device readable storage medium or not, processing circuitry 1920 can be configured to perform the described functionality.

Processing circuitry 1920 may be configured to perform any determining, calculating, or similar operations (e.g., certain obtaining operations) described herein as being performed by the IAB node. These operations, as performed by processing circuitry 1920, may include processing information obtained by processing circuitry 1920 by, for example, converting the obtained information into other information, comparing the obtained information or converted information to information stored by MT 1910, and/or performing one or more operations based on the obtained information or converted information, and as a result of said processing making a determination.

Device readable medium 1930 may be operable to store a computer program, software, an application including one or more of logic, rules, code, tables, etc. and/or other instructions capable of being executed by processing circuitry 1920. Device readable medium 1930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1920. In some embodiments, processing circuitry 1920 and device readable medium 1930 may be considered to be integrated.

User interface equipment 1932 may provide components that allow for a human user to interact with the IAB node. Such interaction may be of many forms, such as visual, audial, tactile, etc. User interface equipment 1932 may be operable to produce output to the user and to allow the user to provide input to the IAB node.

Power source 1936 may, in some embodiments, be in the form of a battery or battery pack. Other types of power sources, such as an external power source (e.g., an electricity outlet), photovoltaic devices or power cells, may also be used. MT 1910 may further comprise power circuitry 1937 for delivering power from power source 1936 to the various parts of MT 1910 which need power from power source 1936 to carry out any functionality described or indicated herein. Power circuitry 1937 may in certain embodiments comprise power management circuitry. Power circuitry 1937 may additionally or alternatively be operable to receive power from an external power source; in which case MT 1910 may be connectable to the external power source (such as an electricity outlet) via input circuitry or an interface such as an electrical power cable. Power circuitry 1937 may also in certain embodiments be operable to deliver power from an external power source to power source 1936. This may be, for example, for the charging of power source 1936.

Power circuitry 1937 may perform any formatting, converting, or other modification to the power from power source 1936 to make the power suitable for the respective components of MT 1910 to which power is supplied.

With reference to FIG. 19, in accordance with an embodiment, a communication system includes a telecommunication network 610, such as a 3GPP-type cellular network, which comprises an access network 611, such as a radio access network, and a core network 614. The access network 611 comprises a plurality of network nodes or base stations 612a, 612b, 612c, such as NBs, eNBs, gNBs or other types of wireless access points, each defining a corresponding coverage area 613a, 613b, 613c. Each network node or base station 612a, 612b, 612c is connectable to the core network 614 over a wired or wireless connection 615. A first wireless device 691 located in coverage area 613c is configured to wirelessly connect to, or be paged by, the corresponding base station 612c. A second wireless device 692 in coverage area 613a is wirelessly connectable to the corresponding base station 612a. While a plurality of wireless devices 691, 692 are illustrated in this example, the disclosed embodiments are equally applicable to a situation where a sole wireless device is in the coverage area or where a sole wireless device is connecting to the corresponding base station 612.

The telecommunication network 610 is itself connected to a host computer 630, which may be embodied in the hardware and/or software of a standalone server, a cloud-implemented server, a distributed server or as processing resources in a server farm. The host computer 630 may be under the ownership or control of a service provider, or may be operated by the service provider or on behalf of the service provider. The connections 621, 622 between the telecommunication network 610 and the host computer 630 may extend directly from the core network 614 to the host computer 630 or may go via an optional intermediate network 620. The intermediate network 620 may be one of, or a combination of more than one of, a public, private or hosted network; the intermediate network 620, if any, may be a backbone network or the Internet; in particular, the intermediate network 620 may comprise two or more subnetworks (not shown).

The communication system of FIG. 19 as a whole enables connectivity between one of the connected wireless devices 691, 692 and the host computer 630. The connectivity may be described as an over-the-top (OTT) connection 650. The host computer 630 and the connected UEs 691, 692 are configured to communicate data and/or signaling via the OTT connection 650, using the access network 611, the core network 614, any intermediate network 620 and possible further infrastructure (not shown) as intermediaries. The OTT connection 650 may be transparent in the sense that the participating communication devices through which the OTT connection 650 passes are unaware of routing of uplink and downlink communications. For example, a base station 612 may not or need not be informed about the past routing of an incoming downlink communication with data originating from a host computer 630 to be forwarded (e.g., handed over) to a connected UE 691. Similarly, the base station 612 need not be aware of the future routing of an outgoing uplink communication originating from the UE 691 towards the host computer 630.

Example implementations, in accordance with an embodiment, of the UE, base station and host computer discussed in the preceding paragraphs will now be described with reference to FIG. 20. In a communication system 700, a host computer 710 comprises hardware 715 including a communication interface 716 configured to set up and maintain a wired or wireless connection with an interface of a different communication device of the communication system 700. The host computer 710 further comprises processing circuitry 718, which may have storage and/or processing capabilities. In particular, the processing circuitry 718 may comprise one or more programmable processors, application-specific integrated circuits, field programmable gate arrays or combinations of these (not shown) adapted to execute instructions. The host computer 710 further comprises software 711, which is stored in or accessible by the host computer 710 and executable by the processing circuitry 718. The software 711 includes a host application 712. The host application 712 may be operable to provide a service to a remote user, such as a UE 730 connecting via an OTT connection 750 terminating at the UE 730 and the host computer 710. In providing the service to the remote user, the host application 712 may provide user data which is transmitted using the OTT connection 750.

The communication system 700 further includes a base station 720 provided in a telecommunication system and comprising hardware 725 enabling it to communicate with the host computer 710 and with the UE 730. The hardware 725 may include a communication interface 726 for setting up and maintaining a wired or wireless connection with an interface of a different communication device of the communication system 700, as well as a radio interface 727 for setting up and maintaining at least a wireless connection 770 with a UE 730 located in a coverage area (not shown in FIG. 7) served by the base station 720. The communication interface 726 may be configured to facilitate a connection 760 to the host computer 710. The connection 760 may be direct or it may pass through a core network (not shown in FIG. 21) of the telecommunication system and/or through one or more intermediate networks outside the telecommunication system. In the embodiment shown, the hardware 725 of the base station 720 further includes processing circuitry 728, which may comprise one or more programmable processors, application-specific integrated circuits, field programmable gate arrays or combinations of these (not shown) adapted to execute instructions. The base station 720 further has software 721 stored internally or accessible via an external connection.

The communication system 700 further includes the UE 730 already referred to. Its hardware 735 may include a radio interface 737 configured to set up and maintain a wireless connection 770 with a base station serving a coverage area in which the UE 730 is currently located. The hardware 735 of the UE 730 further includes processing circuitry 738, which may comprise one or more programmable processors, application-specific integrated circuits, field programmable gate arrays or combinations of these (not shown) adapted to execute instructions. The UE 730 further comprises software 731, which is stored in or accessible by the UE 730 and executable by the processing circuitry 738. The software 731 includes a client application 732. The client application 732 may be operable to provide a service to a human or non-human user via the UE 730, with the support of the host computer 710. In the host computer 710, an executing host application 712 may communicate with the executing client application 732 via the OTT connection 750 terminating at the UE 730 and the host computer 710. In providing the service to the user, the client application 732 may receive request data from the host application 712 and provide user data in response to the request data. The OTT connection 750 may transfer both the request data and the user data. The client application 732 may interact with the user to generate the user data that it provides.

Figure 20:
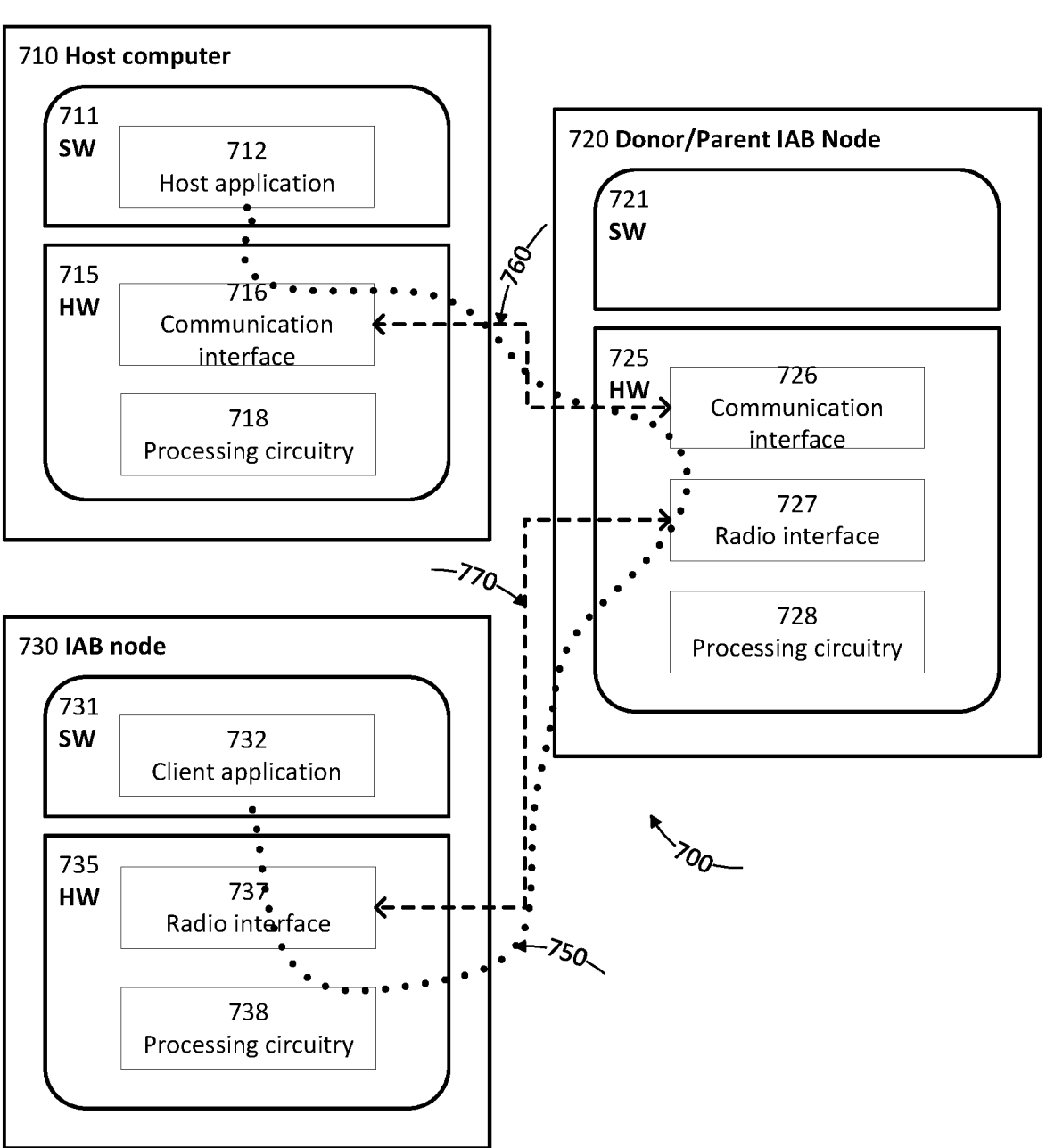
FIG. 20 is a generalized block diagram of a host computer communicating via one or more IAB nodes over a partially wireless connection.
Figures 21, 22:
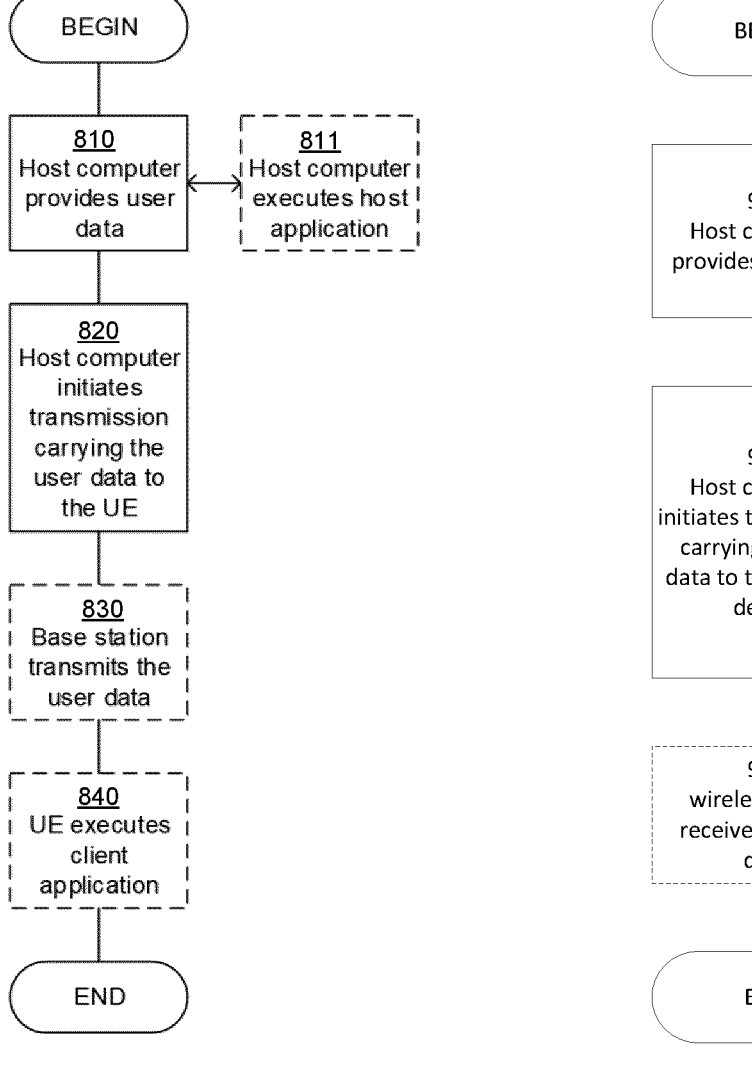
FIGS. 21 to 24 are flowcharts illustrating methods implemented in a communication system including a host computer, IAB nodes and a user equipment.

It is noted that the host computer 710, base station 720 and UE 730 illustrated in FIG. 21 may be identical to the host computer 630, one of the base stations 612*a*, 612*b*, 612*c* and one of the UEs 691, 692 of FIG. 20, respectively. This is to say, the inner workings of these entities may be as shown in FIG. 21 and independently, the surrounding network topology may be that of FIG. 20.

In FIG. 20, the OTT connection 750 has been drawn abstractly to illustrate the communication between the host computer 710 and the use equipment 730 via the base station 720, without explicit reference to any intermediary devices and the precise routing of messages via these devices. Network infrastructure may determine the routing, which it may be configured to hide from the UE 730 or from the service provider operating the host computer 710, or both. While the OTT connection 750 is active, the network infrastructure may further take decisions by which it dynamically changes the routing (e.g., on the basis of load balancing consideration or reconfiguration of the network).

The wireless connection 770 between the UE 730 and the base station 720 is in accordance with the teachings of the embodiments described throughout this disclosure. One or more of the various embodiments improve the performance of OTT services provided to the UE 730 using the OTT connection 750, in which the wireless connection 770 forms the last segment. More precisely, the teachings of these embodiments may improve the radio network cell load and reliability enabling UEs accessing OTT services to maintain their connection and avoid performing handovers which could risk loss of connectivity.

A measurement procedure may be provided for the purpose of monitoring data rate, latency and other factors on which the one or more embodiments improve. There may further be an optional network functionality for reconfiguring the OTT connection 750 between the host computer 710 and UE 730, in response to variations in the measurement results. The measurement procedure and/or the network functionality for reconfiguring the OTT connection 750 may be implemented in the software 711 of the host computer 710 or in the software 731 of the UE 730, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 711, 731 may compute or estimate the monitored quantities. The reconfiguring of the OTT connection 750 may include message format, retransmission settings, preferred routing etc.; the reconfiguring need not affect the base station 720, and it may be unknown or imperceptible to the base station 720. Such procedures and functionalities may be known and practiced in the art. In certain embodiments, measurements may involve proprietary UE signaling facilitating the host computer's 710 measurements of throughput, propagation times, latency and the like. The measurements may be implemented in that the software 711, 731 causes messages to be transmitted, in particular empty or 'dummy' messages, using the OTT connection 750 while it monitors propagation times, errors etc.

FIG. 21 is a flowchart illustrating a method implemented in a communication system, in accordance with one embodiment. The communication system includes a host computer, a base station and a wireless device or UE which may be those described with reference to FIGS. 19 and 20. For simplicity of the present disclosure, only drawing references to FIG. 21 will be included in this section. In a first step 810 of the method, the host computer provides user data. In an optional substep 811 of the first step 810, the host computer provides the user data by executing a host application. In a second step 820, the host computer initiates a transmission carrying the user data to the UE. In an optional third step 830, the base station transmits to the UE the user data which was carried in the transmission that the host computer initiated, in accordance with the teachings of the embodiments described throughout this disclosure. In an optional fourth step 840, the UE executes a client application associated with the host application executed by the host computer.

FIG. 22 is a flowchart illustrating a method implemented in a communication system, in accordance with one embodiment. The communication system includes a host computer, a base station and a wireless device or UE which may be those described with reference to FIGS. 19 and 20. For simplicity of the present disclosure, only drawing references to FIG. 22 will be included in this section. In a first step 910 of the method, the host computer provides user data. In an optional substep (not shown) the host computer provides the user data by executing a host application. In a second step 920, the host computer initiates a transmission carrying the user data to the UE. The transmission may pass via the base station, in accordance with the teachings of the embodiments described throughout this disclosure. In an optional third step 930, the UE receives the user data carried in the transmission.

Figures 23, 24:
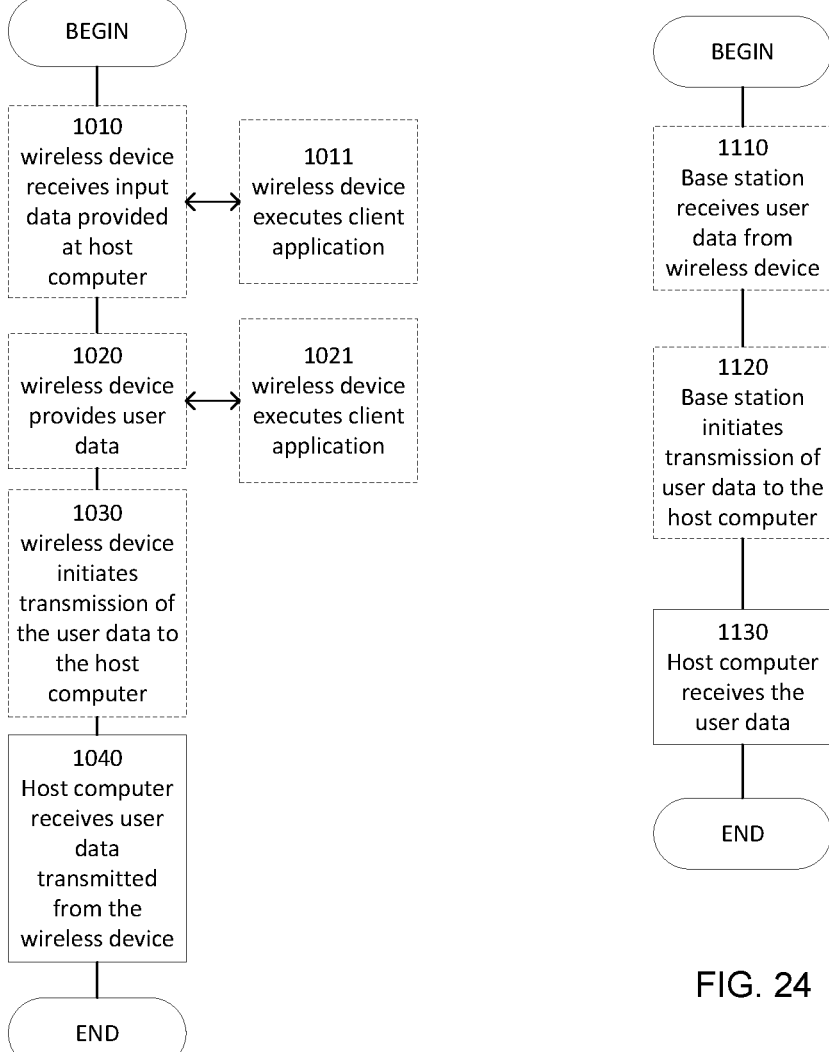

FIG. 23 is a flowchart illustrating a method implemented in a communication system, in accordance with one embodiment. The communication system includes a host computer, a base station and a wireless device or UE which may be those described with reference to FIGS. 19 and 20. For simplicity of the present disclosure, only drawing references to FIG. 23 will be included in this section. In an optional first step 1010 of the method, the UE receives input data provided by the host computer. Additionally or alternatively, in an optional second step 1020, the UE provides user data. In an optional substep 1021 of the second step 1020, the UE provides the user data by executing a client application. In a further optional substep 1011 of the first step 1010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1030, transmission of the user data to the host computer. In a fourth step 1040 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station and a wireless device or UE which may be those described with reference to FIGS. 19 and 20. For simplicity of the present disclosure, only drawing references to FIG. 24 will be included in this section. In an optional first step 1110 of the method, in accordance with the teachings of the embodiments described throughout this disclosure, the base station receives user data from the UE. In an optional second step 1120, the base station initiates transmission of the received user data to the host computer. In a third step

1130, the host computer receives the user data carried in the transmission initiated by the base station.

It should be noted that the above-mentioned examples illustrate rather than limit the invention, and that those skilled in the art will be able to design many alternative embodiments without departing from the scope of the appended embodiments. The word "comprising" does not exclude the presence of elements or steps other than those listed in a embodiment, "a" or "an" does not exclude a plurality, and a single processor or other unit may fulfil the functions of several units recited in the embodiments. Any reference signs in the embodiments shall not be construed so as to limit their scope.

The invention claimed is:

1. A method performed by an integrated access and backhaul, IAB, node for adapting a serving cell capacity, the serving cell serving a plurality of wireless devices, the method comprising:

determining a value corresponding to a backhaul link capacity of the IAB node;

adapting, based on the determined value, a power level of the serving cell; and signaling, to a subset of the plurality of wireless devices, the subset comprising one or more served wireless devices, information indicative of the adapted serving cell power level.

2. The method of claim 1, wherein the power level comprises a reference signal power level.

3. The method of claim 2, wherein the reference signal power level is at least one of SSB/CSI-RS power and referenceSignalPower.

4. The method of claim 1, wherein the information comprises one of:

a reference signal power parameter to indicate an adapted path loss level corresponding to the adapted serving cell power level indicative to the one or more served wireless device to maintain its uplink transmission power with respect to the adapted serving cell power level; and a transmit power level parameter to reduce a transmit power of the one or more served wireless devices, wherein the transmit power level parameter is a cell uplink power control offset to be applied to a power per sub-band calculation to be performed by the one or more served wireless devices, causing a per wireless device reduction in uplink transmit power.

5. The method of claim 1, wherein the signalling information is comprised in a medium access control, MAC, control element, CE, or in a downlink control information, DCI.

6. The method of claim 1, wherein the one or more served wireless devices comprising the subset of the plurality of wireless devices are determined to be within a predefined distance from the serving cell and/or with a radio channel quality above a certain level.

7. The method of claim 1, further comprising:

determining a second value corresponding to the backhaul link capacity and sending to a further one or more wireless devices a transmit power level parameter to reduce a transmit power of the one or more wireless devices based on the determined second value corresponding to the backhaul link capacity.

8. The method of claim 1, wherein one or both of the information and a transmit power level further comprises a backhaul link identifier.

9. The method of claim 1, wherein the wireless device is an IAB node.

10. An integrated access and backhaul, IAB, node for adapting a serving cell capacity, the serving cell serving a plurality of wireless devices, the IAB node being configured to:

determine a value corresponding to a backhaul link capacity of the IAB node;

adapt, based on the determined value, a power level of the serving cell;

signal, to a subset of the plurality of wireless devices, the subset comprising one or more served wireless devices, information indicative of the adapted serving cell power level.

11. The IAB node of claim 10, wherein the power level comprises a reference signal power level.

12. A computer storage medium storing a computer program comprising instructions which when executed on a processor, cause the processor to perform a method of an integrated access and backhaul, IAB, node for adapting a serving cell capacity, the serving cell serving a plurality of wireless devices, the method comprising:

determining a value corresponding to a backhaul link capacity of the IAB node;

adapting, based on the determined value, a power level of the serving cell; and signalling, to a subset of the plurality of wireless devices, the subset comprising one or more served wireless devices, information indicative of the adapted serving cell power level.

\* \* \* \* \*